(12) United States Patent
You

(10) Patent No.: US 11,068,335 B2
(45) Date of Patent: Jul. 20, 2021

(54) MEMORY SYSTEM AND OPERATION METHOD THEREOF

(71) Applicant: SK hynix Inc., Gyeonggi-do (KR)

(72) Inventor: Byoung-Sung You, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 136 days.

(21) Appl. No.: 14/743,729

(22) Filed: Jun. 18, 2015

(65) Prior Publication Data
US 2016/0224466 A1 Aug. 4, 2016

(30) Foreign Application Priority Data

Feb. 4, 2015 (KR) .................. 10-2015-0017240

(51) Int. Cl.
*G06F 11/10* (2006.01)
*G06F 12/0873* (2016.01)
*G06F 12/14* (2006.01)

(52) U.S. Cl.
CPC ...... *G06F 11/1004* (2013.01); *G06F 12/0873* (2013.01); *G06F 12/1408* (2013.01); *G06F 2212/1016* (2013.01); *G06F 2212/214* (2013.01); *G06F 2212/261* (2013.01); *G06F 2212/282* (2013.01); *G06F 2212/283* (2013.01); *G06F 2212/7203* (2013.01)

(58) Field of Classification Search
CPC .... G06F 3/0656; G06F 3/0617; G06F 3/0622; G06F 12/0848; G06F 12/0871; G06F 12/0873; G06F 12/0246
See application file for complete search history.

(56) References Cited

U.S. PATENT DOCUMENTS 6,665,775 B1 * 12/2003 Maiyuran ............. G06F 12/084
  711/128
8,724,392 B1 * 5/2014 Asnaashari ........... G06F 3/0604
  365/158

(Continued)

FOREIGN PATENT DOCUMENTS

CN 101145091 A 3/2008
CN 101203846 A 6/2008

(Continued)

OTHER PUBLICATIONS

Office Action issued by the Chinese Patent Office dated Apr. 2, 2020.

*Primary Examiner* — Tuan V Thai
*Assistant Examiner* — Alexander J Yoon
(74) *Attorney, Agent, or Firm* — IP & T Group LLP

(57) ABSTRACT

A memory system may include a first memory device including a first input/output buffer, a second memory device including a second input/output buffer, and a cache memory suitable for selectively and temporarily storing first and second data to be respectively programmed in the first and second memory devices. The first data is programmed to the first memory device in a first program section by being stored in the cache memory only in a first monopoly section of the first program section. The second data is programmed to the second memory device in a second program section by being stored in the cache memory only in a second monopoly section of a second program section. The first monopoly section and the second monopoly section are set not to overlap each other.

20 Claims, 15 Drawing Sheets

(56) References Cited

U.S. PATENT DOCUMENTS

| | | | |
|---|---|---|---|
| 2001/0025334 A1* | 9/2001 | Fuma | G11B 20/10 |
| | | | 711/113 |
| 2004/0260768 A1* | 12/2004 | Mizuno | G06F 9/52 |
| | | | 709/203 |
| 2005/0177684 A1* | 8/2005 | Hoshino | G06F 12/084 |
| | | | 711/114 |
| 2006/0126390 A1* | 6/2006 | Gorobets | G11C 11/5628 |
| | | | 365/185.22 |
| 2009/0187700 A1* | 7/2009 | Kern | G06F 12/0246 |
| | | | 711/103 |
| 2010/0106893 A1* | 4/2010 | Fasoli | G06F 12/0246 |
| | | | 711/103 |
| 2010/0318721 A1* | 12/2010 | Avila | G06F 11/141 |
| | | | 711/103 |
| 2012/0020167 A1 | 1/2012 | Lee et al. | |
| 2014/0195701 A1* | 7/2014 | Chen | G06F 3/0656 |
| | | | 710/52 |
| 2015/0134886 A1* | 5/2015 | Kim | G06F 12/0246 |
| | | | 711/103 |
| 2016/0070473 A1* | 3/2016 | Levy | G06F 3/0604 |
| | | | 711/102 |

FOREIGN PATENT DOCUMENTS

| | | |
|---|---|---|
| CN | 101470670 A | 7/2009 |
| CN | 102662873 A | 9/2012 |
| KR | 1020100026227 | 3/2010 |

\* cited by examiner

MEMORY SYSTEM AND OPERATION METHOD THEREOF

CROSS-REFERENCE TO RELATED APPLICATIONS

The present application claims priority of Korean Patent Application No. 10-2015-0017240, filed on Feb. 4, 2015, which is incorporated herein by reference in its entirety.

BACKGROUND

1. Field

Exemplary embodiments of the present invention relate to a semiconductor design technology and, more particularly, to a memory system that performs a program operation by using a cache memory.

2. Description of the Related Art

The computing environment paradigm has shifted to ubiquitous computing systems that can be used anytime and anywhere. Because of this, the use of portable electronic devices such as mobile phones, digital cameras, and notebook computers has rapidly increased. Such portable electronic devices generally use memory systems with memory devices, that is, data storage devices. Data storage devices are used as main memory or auxiliary memory devices within the portable electronic devices.

Data storage devices provide excellent stability and durability and operate with high information access speed and low power consumption, since they have no moving parts. Examples of data storage devices having these advantages include universal serial bus (USB) memory devices, memory cards having various interfaces, and solid state drives (SSD).

SUMMARY

Various embodiments are directed to a memory system capable of efficiently managing a cache memory in a program operation process.

In an embodiment, a memory system may include a first memory device including a first input/output buffer, a first memory device including a first input/output buffer; a second memory device including a second input/output buffer; and a cache memory suitable for selectively and temporarily storing first and second data to be respectively programmed in the first and second memory devices, wherein the first data is programmed to the first memory device in a first program section by being stored in the cache memory only in a first monopoly section of the first program section, wherein the second data is programmed to the second memory device in a second program section by being stored in the cache memory only in a second monopoly section of a second program section, and wherein the first monopoly section and the second monopoly section are set not to overlap each other.

A memory system may further include: a data correction unit suitable for scrambling and descrambling the first and second data transferred between the cache memory and the first and second memory devices.

The first monopoly section may include: a first input section from when the first data is inputted from a host to the cache memory and stored in the cache memory to when the first data is transferred to and stored in the first input/output buffer, for a first operation of the first program section; and a second input section from when the first data stored in the first input/output buffer is outputted to and stored in the cache memory to when the first data is transferred to and stored in the first input/output buffer, for a second operation of the first program section when the first operation of the first program section is determined to 'fail' after the first input section.

The second monopoly section may include: a third input section from when the second data is inputted from the host to the cache memory and stored in the cache memory to when the second data is transferred to and stored in the second input/output buffer, for a first operation of the second program section; and a fourth input section from when the second data stored in the second input/output buffer is outputted to and stored in the cache memory to when the second data is transferred to and stored in the second input/output buffer, for a second operation of the second program section when the first operation of the second program section is determined to 'fail' after the third input section.

The first program section and the second program section may be repeated with a preset time difference, when the second program section is started when the first input section passes after the first program section may be started, the third input section overlaps the first program section, and when the first program section is when the second input section passes after the second program section may be started, the first input section overlaps the second program section.

The first data stored in the cache memory may be scrambled through the data correction unit and is stored in the first input/output buffer in the first and second input sections, the second data stored in the cache memory may be scrambled through the data correction unit and is stored in the second input/output buffer in the third and fourth input sections, the first data stored in the first input/output buffer may be descrambled through the data correction unit and stored in the cache memory in the second input section, and the second data stored in the second input/output buffer may be descrambled through the data correction unit and stored in the cache memory in the fourth input section.

The first data stored in the first input/output buffer in the first input section may be stored in a page set in the first memory device through the first operation of the first program section, the first data stored in the first input/output buffer in the second input section may be stored in a different page than the page set in the first memory device through the second operation of the first program section, and only when the first operation of the first program section corresponding to the first input section is determined to 'fail', the second operation of the first program section corresponding to the second input section may be performed.

Whenever the second operation of the first program section corresponding to the second input section is determined to 'fail', the second operation of the first program section corresponding to the second input section may be repeatedly performed a preset number of times, and whenever the second operation of the first program section corresponding to the second input section is repeatedly performed the preset number of times, the first data may be stored in different pages of the first memory device.

The second data stored in the second input/output buffer in the third input section may be stored in a page set in the second memory device through the first operation of the second program section, the second data stored in the second input/output buffer in the fourth input section may be stored in a different page than the page set in the second memory device through the second operation of the second program section, and only when the first operation of the second program section corresponding to the third input section is determined to 'fail', the second operation of the second program section corresponding to the fourth input section may be performed.

Whenever the second operation of the second program section corresponding to the fourth input section is determined to 'fail', the second operation of the second program section corresponding to the fourth input section may be repeatedly performed a preset number of times, and whenever the second operation of the second program section corresponding to the fourth input section is repeatedly performed the preset number of times, the second data may be stored in different pages in the second memory device.

The first memory device may include: a plurality of first nonvolatile memory cells for storing multi-bit data, wherein the first data is the multi-bit data and is divided into first MSB data and first LSB data, wherein the cache memory and the first input/output buffer simultaneously store the first MSB data and the first LSB data in a separate manner, wherein the first MSB data is transmitted and the first LSB data is subsequently transmitted between the cache memory and the first input/output buffer in each of the first and second input sections, and wherein the first MSB data and the first LSB data stored in the first input/output buffer are simultaneously programmed in the plurality of first nonvolatile memory cells in the first program section.

The second memory device may include: a plurality of second nonvolatile memory cells for storing multi-bit data, wherein the second data is multi-bit data and is divided into second MSB data and second LSB data, wherein the cache memory and the second input/output buffer simultaneously store the second MSB data and the second LSB data in a separate manner, wherein the second MSB data is transmitted and the second LSB data is subsequently transmitted between the cache memory and the second input/output buffer in each of the third and fourth input sections, and wherein the second MSB data and the second LSB data stored in the second input/output buffer are simultaneously programmed in the plurality of second nonvolatile memory cells in the second program section.

In another embodiment, an operation method of a memory system may include: first storing first data in a cache memory when entering a first monopoly section of a first program section to program the first data to a first memory device in the first program section; first releasing the cache memory and escaping from the first monopoly section by transferring and storing the first data stored in the cache memory in the first storing to/in a first input/output buffer of the first memory device; second storing second data in the cache memory when entering a second monopoly section of a second program section to program the second data to a second memory device in the second program section, the second monopoly section not overlapping the first monopoly section; and second releasing the cache memory and escaping from the second monopoly section by transferring and storing the second data stored in the cache memory in the second storing to/in a second input/output buffer of the second memory device, wherein the cache memory selectively and temporarily stores the first and second data to be respectively programmed in the first and second memory devices.

An operation method of a memory system may further include: third storing the first data stored in the first input/output buffer through the first releasing in the cache memory by re-entering the first monopoly section when an operation of the first program section is determined to 'fail' after the first releasing; third releasing the cache memory and escaping from the first monopoly section by transferring and storing the first data stored in the cache memory in the third storing to/in the first input/output buffer; fourth storing the second data stored in the second input/output buffer through the second releasing in the cache memory by re-entering the second monopoly section when an operation of the second program section is determined to 'fail' after the second releasing; and fourth releasing the cache memory and escaping from the second monopoly section by transferring and storing the second data stored in the cache memory in the fourth storing to/in the second input/output buffer.

The first and third releasing may include scrambling the first data when transferring and storing the first data stored in the cache memory to/in the first input/output buffer, and the second and fourth releasing may include scrambling the second data when transferring and storing the second data stored in the cache memory to/in the second input/output buffer.

The third storing may include descrambling the first data, and the fourth storing may include descrambling the second data.

The first data stored in the first input/output buffer through the first releasing may be stored in a page set in the first memory device through the operation of the first program section, and the first data stored in the first input/output buffer through the third releasing may be stored in different page than the page set in the first memory device through the operation of the first program section.

The second data stored in the second input/output buffer through the second releasing may be stored in a page set in the second memory device through the operation of the second program section, and the second data stored in the second input/output buffer through the fourth releasing may be stored in a different page than the page set in the second memory device through the operation of the second program section.

An operation method of a memory system further include: first repeating the third storing and the third releasing a preset number of times when the operation of the first program section is determined to 'fail' after the third releasing; and second repeating the fourth storing and the fourth releasing a preset number of times when the operation of the second program section is determined to 'fail' after the fourth releasing. Whenever the first repeating is repeatedly performed the preset number of times, the first data may be stored in different pages of the first memory device, and whenever the second repeating is repeatedly performed the preset number of times, the second data may be stored in different pages of the second memory device.

When the first data is divided into first MSB data and first LSB data, the first MSB data may be transmitted and the first LSB data may be subsequently transmitted between the cache memory and the first input/output buffer, and the first MSB data and the first LSB data stored in the first input/output buffer may be simultaneously programmed in a core area of the first memory device, and when the second data is divided into second MSB data and second LSB data, the second MSB data may be transmitted and the second LSB data may be subsequently transmitted between the cache memory and the second input/output buffer, and the second MSB data and the second LSB data stored in the second input/output buffer may be simultaneously programmed in a core area of the second memory device.

In accordance with the present technology, the memory device may monopolistically use the cache memory only in a partial monopoly section of the program operation section, and release the cache memory in the other sections.

Consequently, a plurality of memory devices may properly perform a program operation while sharing one cache memory for use.

Furthermore, the plurality of memory devices share one cache memory for use, so that a memory system including the plurality of memory devices may significantly reduce the capacity of a cache memory used therein.

DETAILED DESCRIPTION

Figure 1:
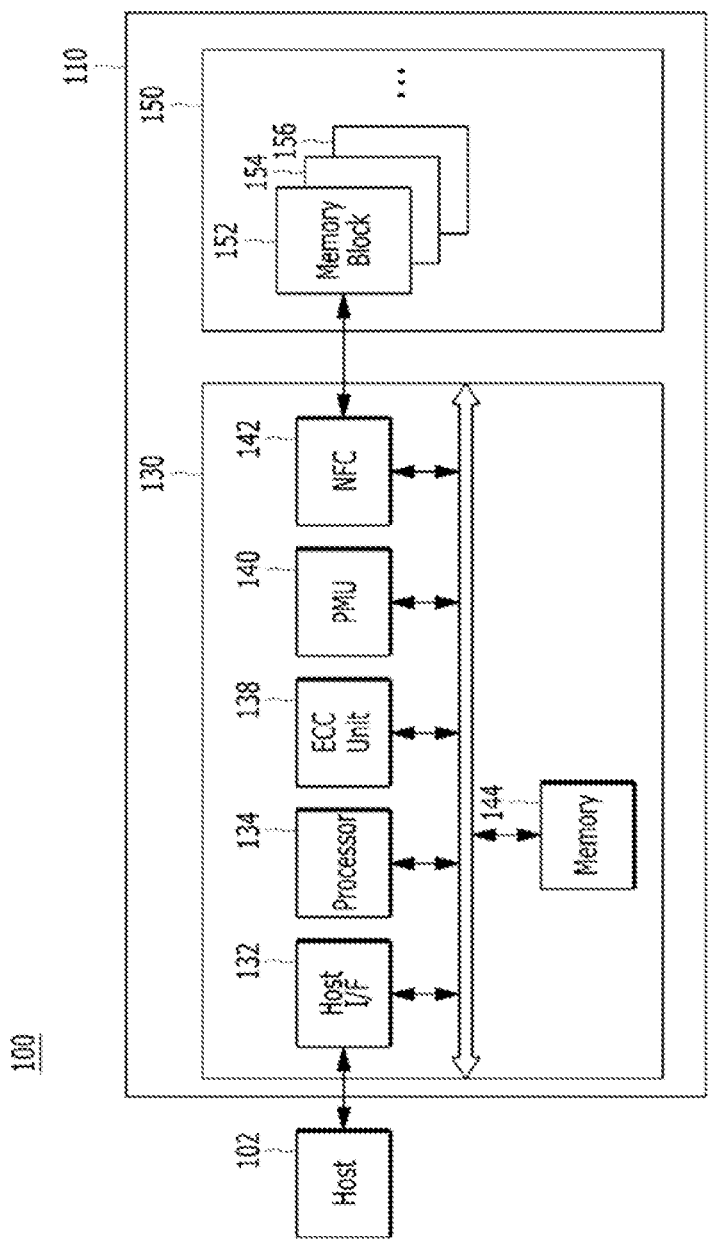
FIG. 1 is a diagram illustrating a data processing system including a memory system in accordance with an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. Furthermore, when it is described that one "comprises" (or "includes") or "has" some elements, it should be understood that it may comprise (or include) or have only those elements, or it may comprise (or include) or have other elements as well as those elements if there is no specific limitation. The terms of a singular form may include plural forms unless referred to the contrary.

FIG. 1 is a diagram illustrating a data processing system including a memory system in accordance with an embodiment of the present invention.

Referring to FIG. 1, the data processing system 100 may include a host 102 and a memory system 110.

The host 102 includes, for example, a portable electronic device such as a mobile phone, an MP3 player and a laptop computer or an electronic device such as a desktop computer, a game player, a TV and a projector.

The memory system 110 operates in response to a request from the host 102, and in particular, stores data to be accessed by the host 102. In other words, the memory system 110 may be used as a main memory device or an auxiliary memory device of the host 102. The memory system 110 may be implemented with any one of various kinds of storage devices, depending on the protocol of its host interface to be electrically coupled with the host 102. For example, the memory system 110 may be implemented with any one of various kinds of storage devices such as a solid state drive (SSD), a multimedia card (MMC), an embedded MMC (eMMC), a reduced size MMC (RS-MMC), a micro-MMC, a secure digital (SD), a mini-SD, a micro-SD, a universal serial bus (USB) storage device, a universal flash storage (UFS) device, a compact flash (CF) card, a smart media (SM) card, a memory stick, and so forth.

The memory system 110 may be implemented with a volatile memory device such as a dynamic random access memory (DRAM) and a static random access memory (SRAM), or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). When the memory system 110 is used as an SSD, the operation speed of the host 102, which is electrically coupled with the memory system 110 may be significantly increased.

The controller 130 and the memory device 150 may be integrated into one semiconductor device and configure a memory card. For example, the controller 130 and the memory card 150 may be integrated into one semiconductor device and configure a memory card such as a personal computer memory card international association (PCMCIA) card, a compact flash (CF) card, a smart media (SM) card, a memory stick, a multimedia card (MMC), an RS-MMC, a micro-MMC, a secure digital (SD), a mini-SD, a micro-SD, an SDHC, and a universal flash storage (UFS) device.

For another instance, the memory system 110 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted and, in particular, store the data provided from the host 102 during a write operation, and provide stored data to the host 102 during a read operation. The memory device 150 includes a plurality of memory blocks 152, 154 and 156. Each of the memory blocks 152, 154 and 156 includes a plurality of pages. Each of the pages includes a plurality of memory cells to which a plurality of word lines (WL) are electrically coupled.

The memory device 150 may be a nonvolatile memory device, for example, a flash memory. The flash memory may have a three-dimensional (3D) stack structure. The structure of the memory device 150, the three-dimensional (3D) stack structure of the memory device 150, will be described later in detail with reference to FIGS. 2 to 11.

The controller 130 of the memory system 110 controls the memory device 150 in response to a request from the host 102. For example, the controller 130 provides the data read from the memory device 150, to the host 102, and stores the data provided from the host 102, in the memory device 150. To this end, the controller 130 controls overall operations of the memory device 150, such as read, write, program and erase operations.

In detail, the controller 130 includes a host interface unit 132, a processor 134, an error correction code (ECC) unit 138, a power management unit 140, a NAND flash controller 142, and a memory 144.

The host interface unit 132 processes commands and data provided from the host 102, and may be configured to communicate with the host 102 through one or more of various interface protocols such as a universal serial bus (USB), a multimedia card (MMC), a peripheral component interconnect-express (PCI-E), a serial advanced technology attachment (SATA), a parallel advanced technology attachment (PATA), a small computer system interface (SCSI), a serial-attached SCSI (SAS), an enhanced small disk interface (ESDI), and an integrated drive electronics (IDE).

The ECC unit 138 detects and corrects an error included in the data read from the memory device 150 during the read operation. That is, after having performed an error correction decoding operation on the data read from the memory device 150, the ECC unit 138 may determine whether the error correction decoding operation has succeeded, output an indication signal in response to a determination result, and correct an error bit of the read data based on a parity bit generated by an ECC encoding process. When the number of the error bits is equal to or greater than a threshold number of correctable error bits, the ECC unit 138 may not correct the error bits and may output an error correction fall signal.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a confolutional code, a recursive systematic code (RSC), a trellis-coded modulation (TCM), a Block coded modulation (BCM), and so on. The ECC unit 138 may include all circuits, systems or devices for the error correction operations.

The NFC 142 serves as a memory interface between the controller 130 and the memory device 150 to allow the controller 130 to control the memory device 150 in response to a request from the host 102. The NFC 142 generates control signals and processes data for the memory device 150 under the control of the processor 134, when the memory device 150 is a flash memory and, in particular, when the memory device 150 is a NAND flash memory.

The memory 144 serves as a working memory of the memory system 110 and the controller 130, and stores data for driving the memory system 110 and the controller 130. The controller 130 controls the memory device 150 in response to a request from the host 102. For example, the controller 130 provides the data read from the memory device 150 to the host 102, and stores the data provided from the host 102 in the memory device 150. To this end, the controller 130 controls the operations of the memory device 150, such as read, write, program and erase operations, and the memory 144 stores data needed to allow such operations.

The memory 144 may be implemented with volatile memory. For example, the memory 144 may be implemented with a static random access memory (SRAM) or a dynamic random access memory (DRAM). As described above, the memory 144 stores data needed to perform the read and write operations between the host 102 and the memory device 150. To store the data, the memory 144 includes a program memory, a data memory, a write buffer, a read buffer, a map buffer, and so forth.

The processor 134 controls general operations of the memory system 110, and controls a write operation or a read operation for the memory device 150, in response to a write request or a read request from the host 102. The processor 134 drives firmware, which is referred to as a flash translation layer (FTL), to control the general operations of the memory system 110. The processor 134 may be implemented with a microprocessor or a central processing unit (CPU).

A management unit (not shown) for performing "bad management," for example, bad block management, of the memory device 150 is included in the processor 134. The management unit checks the plurality of memory blocks included in the memory device 150, finds those that are bad (are in unsatisfactory condition for further use) and performs bad block management. When the memory device 150 is a flash memory, for example, a NAND flash memory, a program failure may occur during the write operation, for example, during the program operation, due to characteristics of a NAND logic function. "Bad block management" are operations for processing memory blocks in which a program failure has occurred, as bad, and programming the data that has failed to be programmed in a new memory block. Hereinbelow, the memory device in the memory system in accordance with an embodiment will be described in detail with reference to FIGS. 2 to 11.

Figure 2:
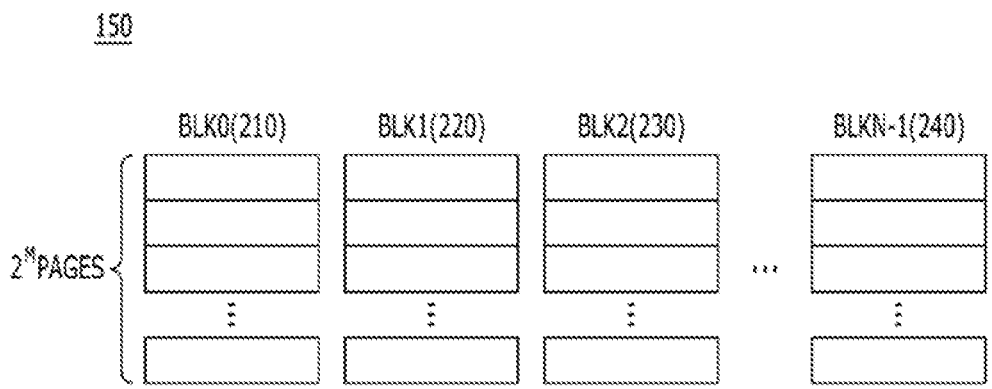
FIG. 2 is a diagram illustrating a memory device in the memory system shown in FIG. 1.

FIG. 2 is a diagram illustrating the memory device 150 in the memory system 110 shown in FIG. 1.

Referring to FIG. 2, the memory device 150 includes a plurality of memory blocks, for example, a zeroth memory block (BLK0) 210, a first memory block (BLK1) 220, a second memory block (BLK2) 230 and an N-1$^{th}$ memory block (BLKN-1) 240. Each of the memory blocks 210, 220, 230 and 240 includes a plurality of pages, for example, $2^M$ number of pages ($2^M$PAGES). While it is shown that each of the plurality of memory blocks includes $2^M$ number of pages, it is to be noted that each of the memory blocks may include M number (or any number) of pages. Each of the pages includes a plurality of memory cells to which a plurality of word lines (WL) are electrically coupled.

Also, the memory device 150 may include a plurality of memory blocks, as single level cell (SLC) memory blocks and multi-level cell (MLC) memory blocks, depending on the number of bits which may be stored in each memory cell. The SLC memory block includes a plurality of pages which are implemented with memory cells each capable of storing 1-bit data, and may have high data calculation performance and superior durability. The MLC memory block includes a plurality of pages which are implemented with memory cells each capable of storing multi-bit data, for example, two or more-bit data, and may have a data storage space larger than the SLC memory block, that is, may be highly integrated. An MLC memory block including a plurality of pages which are implemented with memory cells each capable of storing 3-bit data may be defined as a triple level cell (TLC) memory block.

Each of the memory blocks 210, 220, 230 and 240 stores the data provided from the host device 102 of FIG. 1 during a write operation, and provides stored data to the host 102 during a read operation.

Figure 3:
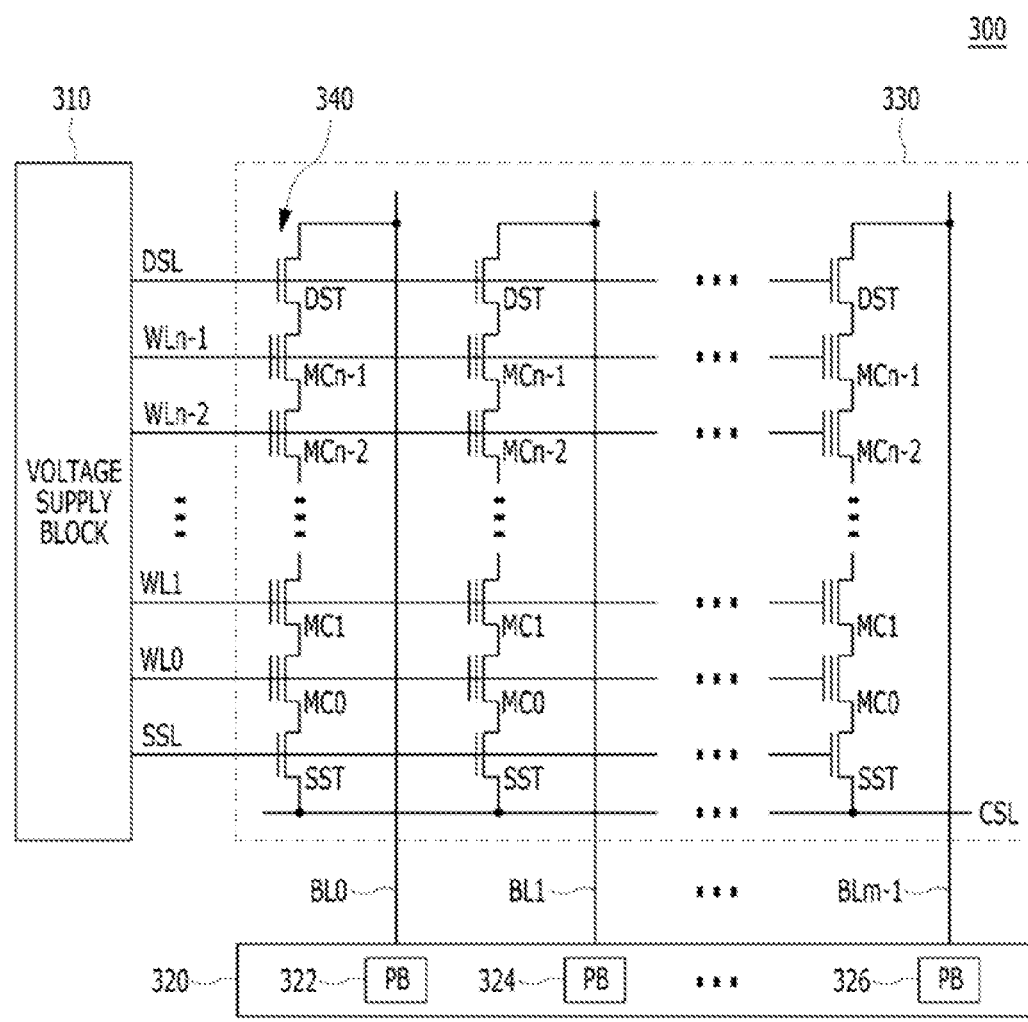
FIG. 3 is a circuit diagram illustrating a memory block in a memory device in accordance with an embodiment.

FIG. 3 is a circuit diagram illustrating a memory block in a memory device in accordance with an embodiment of the present invention.

Referring to FIG. 3, the memory block 330 of the memory device 300 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured as multi-level cells (MLC), each of which stores data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example, the memory block 330 that includes NAND flash memory cells, it is to be noted that the memory block 330 of the memory device 300 in accordance with an embodiment is not limited to NAND flash memory and may be realized as NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 300 may provide word line voltages, for example, a program voltage, a read voltage and a pass voltage, to respective word lines based on an operation mode and may provide voltages to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 300 is controlled by the control circuit, and may serve as a sense amplifier or a write driver based on an operation mode. For example, during a verification or read operation, the read/write circuit 320 may serve as a sense amplifier for reading data from the memory cell array. Also, during a program operation, the read/write circuit 320 may serve as a write driver which drives bit lines based on data to be stored in the memory cell array. The read/write circuit 320 may receive data to be written in the memory cell array, from a buffer (not shown), during the program operation, and may drive the bit lines based on the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

Hereinbelow, detailed descriptions will be made with reference to FIGS. 4 to 11, for the memory device 150 in the memory system in accordance with an embodiment, when the memory device 150 is implemented with a three-dimensional (3D) nonvolatile memory device.

Figure 4:
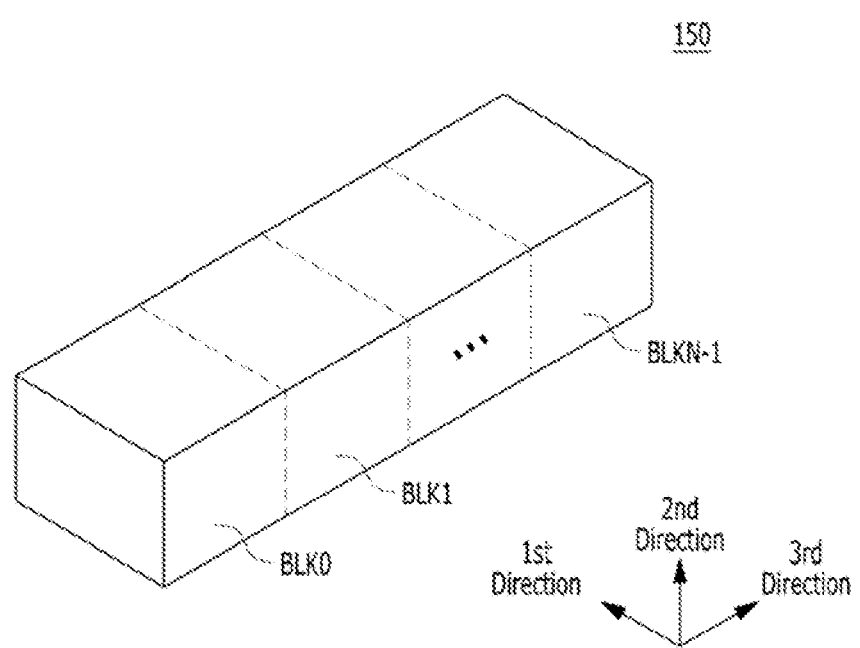
FIGS. 4 to 11 are diagrams schematically illustrating the memory device shown in FIG. 2.

FIG. 4 is a block diagram illustrating the memory blocks BLK0 to BLKN−1 of the memory device 150 shown in FIG. 2.

Referring to FIG. 4, the memory device 150 may include the plurality of memory blocks BLK0 to BLKN−1, and each of the memory blocks BLK0 to BLKN−1 may be realized in a three-dimensional (3D) structure or a vertical structure. Each of the memory blocks BLK0 to BLKN−1 may include structures which extend in first to third directions (i.e. an x-axis direction, a y-axis direction and a z-axis direction).

Each of the memory blocks BLK0 to BLKN−1 may include a plurality of NAND strings NS which extend in the second direction. The plurality of NAND strings NS may be arranged in the first direction and the third direction. Each NAND string NS may be electrically coupled to a bit line BL, at least one source select line SSL, at least one ground select line GSL, a plurality of word lines WL, at least one dummy word line DWL, and a common source line CSL. Namely, each of the memory blocks BLK0 to BLKN−1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
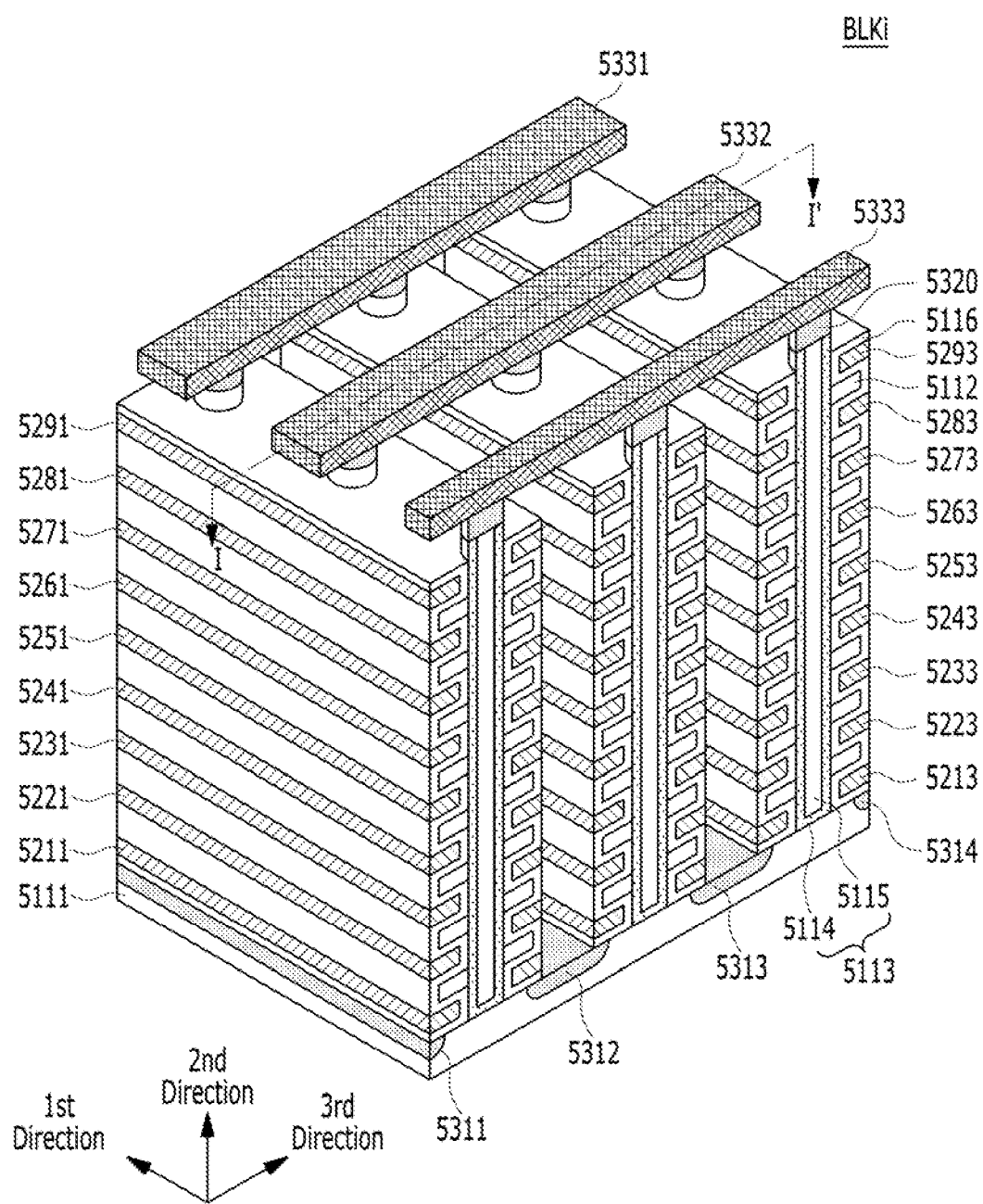
Figure 6:
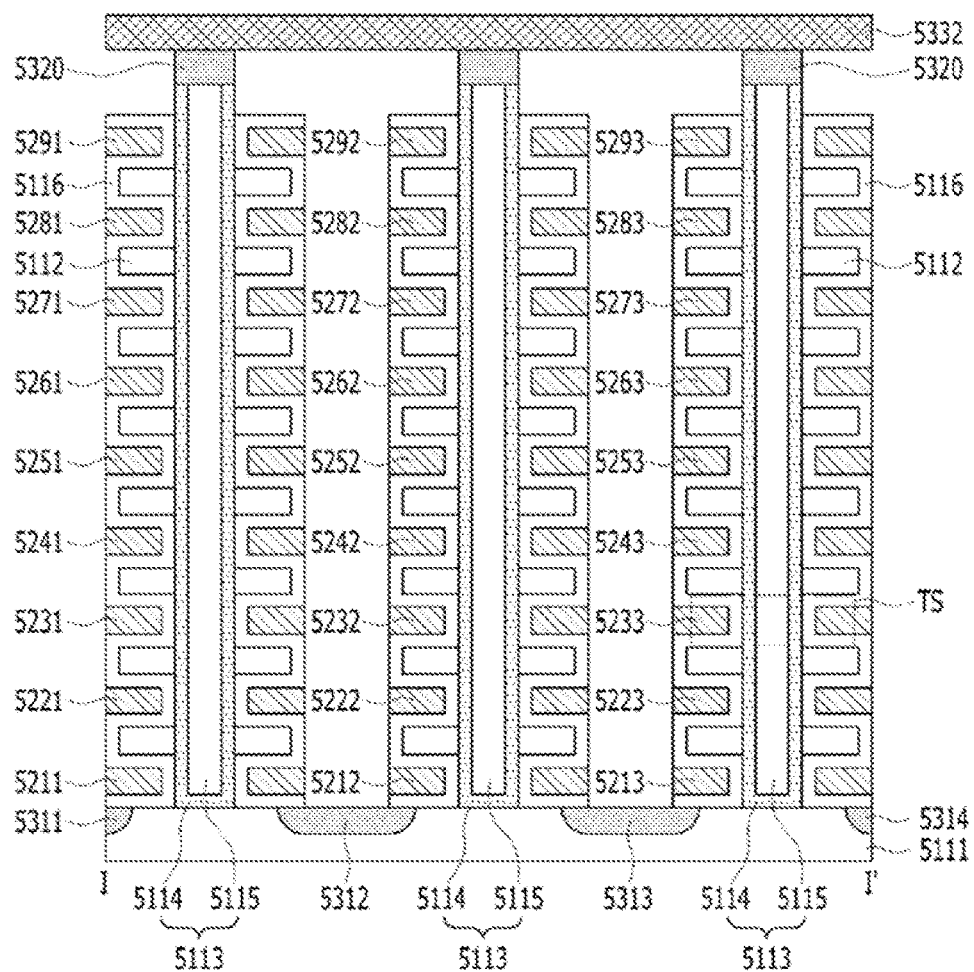

FIG. 5 is a perspective view of one of the memory blocks BLK0 to BLKN−1 shown in FIG. 4. FIG. 6 is a cross-sectional view taken along a line I-I' of the memory block BLKi shown in FIG. 5.

Referring to FIGS. 5 and 6, a memory block BLKi of the memory device 150 may include a structure which extends in the first to third directions.

A substrate 5111 may be provided. The substrate 5111 may include a silicon material doped with a first type impurity. For example, the substrate 5111 may include a silicon material doped with a p-type impurity, or may be a p-type well, for example, a pocket p-well, and include an n-type well which surrounds the p-type well. While it is described in the embodiment that the substrate 5111 is p-type silicon, it is to be noted that the substrate 5111 is not limited to being p-type silicon.

A plurality of doping regions 5311 to 5314 which extend in the first direction may be provided over the substrate 5111. The plurality of doping regions 5311 to 5314 may contain a second type of impurity that is different from the substrate 5111. The plurality of doping regions 5311 to 5314 may be doped with an n-type impurity. While it is described in the embodiment that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 which extend in the first direction may be sequentially provided in the second direction. The plurality of dielectric materials 5112 and the substrate 5111 may be separated from one another by a predetermined distance in the second direction. The plurality of dielectric materials 5112 may be separated from one another by a predetermined distance in the second direction. The dielectric materials 5112 may include a dielectric material such as silicon oxide.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may pass through the dielectric materials 5112 and may be electrically coupled with the substrate 5111. Each pillar 5113 may be configured by a plurality of materials. A surface layer 5114 of each pillar 5113 may include a silicon material doped with the first type of impurity. The surface layer 5114 of each pillar 5113 may include a silicon material doped with the same type of impurity as the substrate 5111. While it is described in the embodiment that the surface layer 5114 of each pillar 5113 includes p-type silicon, it is to be noted that the surface layer 5114 of each pillar 5113 is not limited to p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be smaller than half of the distance between the dielectric materials 5112. In other words, a region for a material other than the dielectric material 5112 and the dielectric layer 5116 to be disposed may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. For example, the conductive material 5211 which extends in the first direction may be provided between the dielectric material 5112 adjacent to the substrate 5111 and the substrate 5111. In particular, the conductive material 5211 may be provided between (i) the dielectric layer 5116 disposed over the substrate 5111 and (ii) the dielectric layer 5116 disposed over the bottom surface of the dielectric material 5112 adjacent to the substrate 5111.

For another example, the conductive materials 5221 to 5281 which extend in the first direction may be provided between (i) the dielectric layer 5116 disposed over the top surface of a certain dielectric material of the dielectric materials 5112 and (ii) the dielectric layer 5116 disposed over the bottom surface of another dielectric material of the dielectric materials 5112, which is disposed over the certain dielectric material 5112. The conductive material 5291 which extends in the first direction may be provided over the uppermost dielectric material 5112. The conductive materials 5211 to 5291 may be a metallic material. For example, the conductive materials 5211 to 5291 may be polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided.

In the region between the third and fourth doping regions 5313 and 5314, the same structures as the structures between the first and second doping regions 5311 and 5312 may be provided. For example, in the region between the third and fourth doping regions 5313 and 5314, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. While it is described that the drains 5320 include n-type silicon, it is to be noted that the drains 5320 are not limited to n-type silicon. The width of each drain 5320 may be larger than the width of each corresponding pillar 5113. For example, each drain 5320 may be provided in the shape of a pad over the top surface of each corresponding pillar 5113.

Conductive materials 5331 to 5333 which extend in the third direction may be provided over the drains 5320. The conductive materials 5331 to 5333 may be sequentially disposed in the first direction. The conductive materials 5331 to 5333 may be electrically coupled with the drains 5320 of corresponding regions. The drains 5320 and the conductive materials 5331 to 5333 may be electrically coupled with each other through contact plugs. The conductive materials 5331 to 5333 may be a metallic material. For example, the conductive materials 5331 to 5333 may be a polysilicon material.

In FIGS. 5 and 6, the respective pillars 5113 may form strings together with the dielectric layer 5116 and the conductive materials 5211 to 5291, 5212 to 5292 and 5213 to 5293 which extend in the first direction. For example, the respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
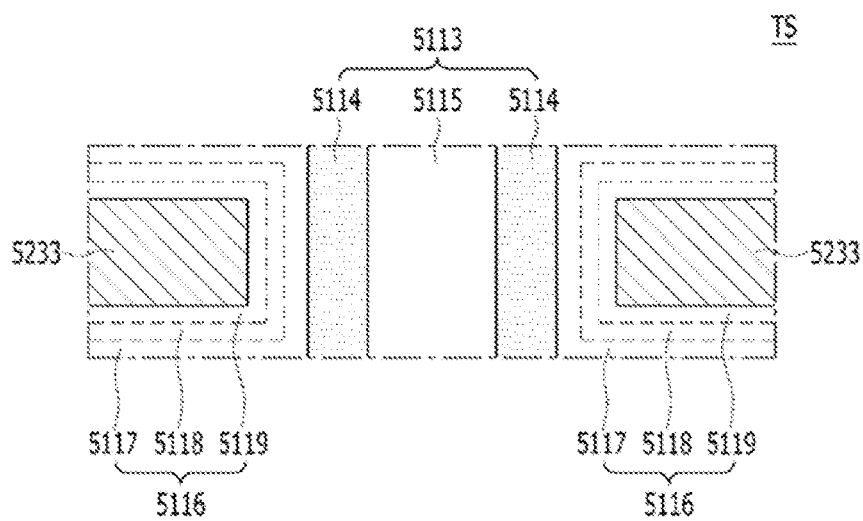

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing/trapping layer. For example, the second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. For example, the third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for a simplified explanation, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a source select transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 which extend in the first direction. In other words, the gates or the control gates may extend in the first direction and form word lines and at least two select lines, for example, at least one source select line SSL and at least one ground select line GSL.

The conductive materials 5331 to 5333 which extend in the third direction may be electrically coupled to one end of the NAND strings NS. For example, the conductive materials 5331 to 5333 may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 may serve as common source lines CSL.

Namely, the memory block BLKi includes a plurality of NAND strings NS which extend in a direction perpendicular to the substrate 5111, e.g., the second direction, and may serve as a NAND flash memory block, for example, of a charge capturing type memory, in which the plurality of NAND strings NS are electrically coupled to one bit line BL.

While it is illustrated in FIGS. 5 to 7 that the conductive materials 5211 to 5291, 5212 to 5292 and 5213 to 5293 which extend in the first direction are provided in 9 layers, it is to be noted that the conductive materials 5211 to 5291, 5212 to 5292 and 5213 to 5293 are not limited to having 9 layers. For example, conductive materials which extend in the first direction may have 8 layers, 16 layers or any multiple of layers. In other words, in one NAND string NS, there may be any number of transistors.

While it is illustrated in FIGS. 5 to 7 that 3 NAND strings NS are electrically coupled to one bit line BL, it is to be noted that the embodiment is not limited to having 3 NAND strings NS that are electrically coupled to one bit line BL. For example, in the memory block BLKi, m number of NAND strings NS may be electrically coupled to one bit line BL, m being a positive integer. Depending on the number of NAND strings NS which are electrically coupled to one bit line BL, the number of conductive materials 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to having 3 NAND strings NS that are electrically coupled to one conductive material which extends in the first direction. For example, n number of NAND strings NS may be electrically coupled to one conductive material which extends in the first direction, n being a positive integer. Depending on the number of NAND strings NS that are electrically coupled to one conductive material which extends in the first direction, the number of bit lines 5331 to 5333 may be controlled as well.

Figure 8:
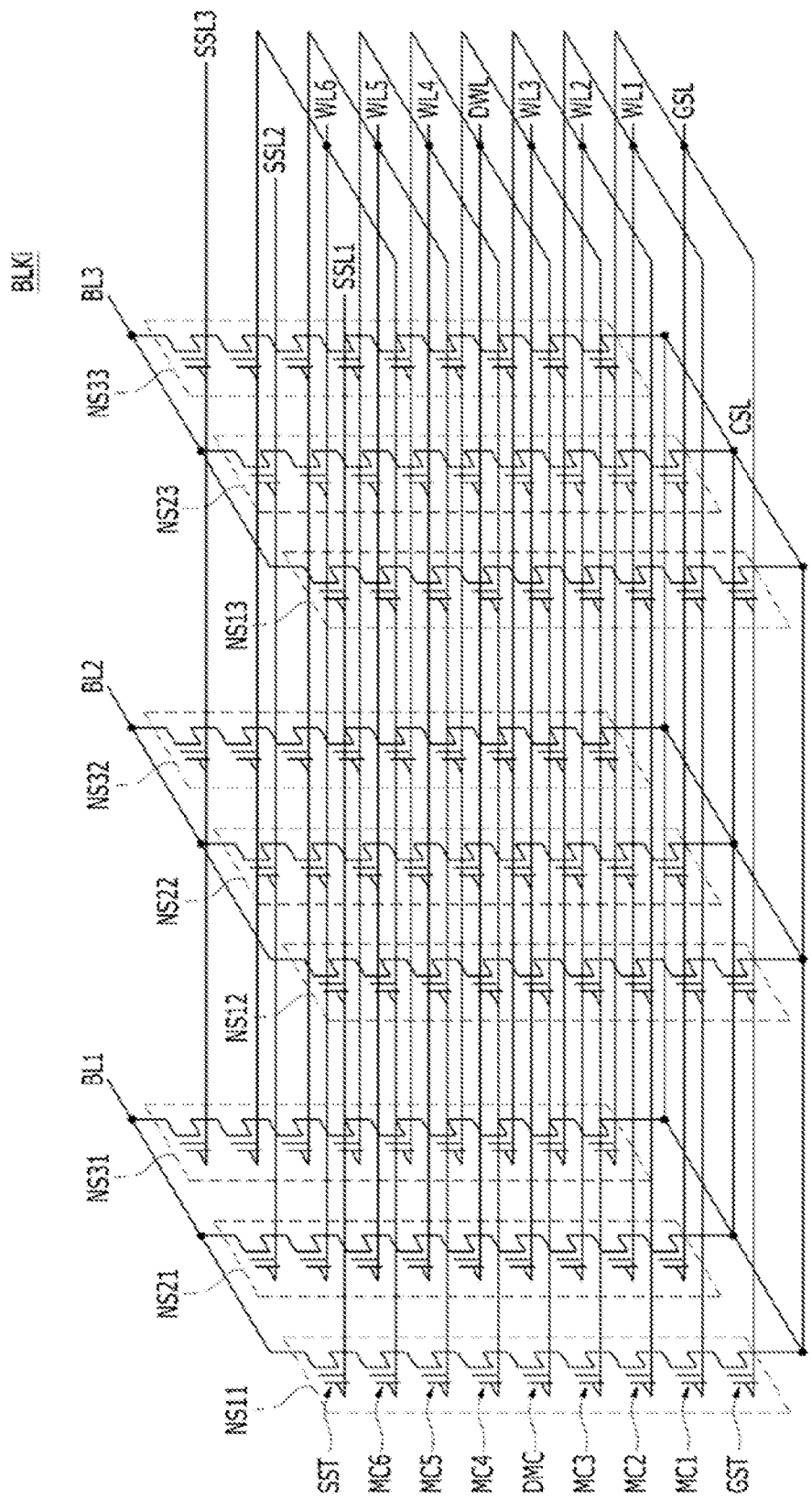

FIG. 8 is an equivalent circuit diagram illustrating the memory block BLKi having a first structure described with reference to FIGS. 5 to 7.

Referring to FIG. 8, in the certain block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In the embodiment, for a simplified explanation, the NAND strings NS may be defined on the basis of rows and columns and NAND strings NS which are electrically coupled in common to one bit line may form one column. For example, the NAND strings NS11 to NS31 which are electrically coupled to the first bit line BL1 may correspond to a first column, and the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. For example, the NAND strings NS11 to NS13 which are electrically coupled to a first source select line SSL1 may form a first row, and the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, the height of a memory cell may increase as the memory cell gets closer to the source select transistor SST when measured from the substrate 5111. For example in each NAND string NS, the height of a memory cell MC6 adjacent to the source select transistor SST is 7 while the height of a memory cell MC1 adjacent to the ground select transistor GST is 1.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled. Dummy memory cells DMC at the same height in the NAND strings NS of the same row may share a dummy word line DWL. Namely, at the same height, the dummy word lines DWL electrically coupled to the dummy memory cells DMC of the NAND strings NS in different rows may be electrically coupled.

For example, the word lines WL or the dummy word lines DWL located at the same height may be electrically coupled at layers where the conductive materials 5211 to 5291, 5212 to 5292 and 5213 to 5293 which extend in the first direction are provided. For example, the conductive materials 5211 to 5291, 5212 to 5292 and 5213 to 5293 may be electrically to upper layers through contacts. At the upper layers, the conductive materials 5211 to 5291, 5212 to 5292 and 5213 to 5293 may be electrically coupled. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. For example, over the active regions over the substrate 5111, the first to fourth doping regions 5311 to 5314 may be electrically coupled. For example, the first to fourth doping regions 5311 to 5314 may be electrically coupled to an upper layer through contacts and, at the upper layer, the first to fourth doping regions 5311 to 5314 may be electrically coupled.

Namely, as shown in FIG. 8, the word lines WL of the same height may be electrically coupled. Accordingly, when a certain word line WL at a specific height is selected, all NAND strings NS which are electrically coupled to the certain word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC is provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST, may be referred to as a lower memory cell group, and memory cells, for example, MC4 to MC6, adjacent to the source select transistor SST, may be referred to as an upper memory cell group.

Hereinbelow, detailed descriptions will be made with reference to FIGS. 9 to 11, when the memory device in the memory system in accordance with an embodiment is implemented with a three-dimensional (3D) nonvolatile memory device of a second structure that is different from the first structure.

Figure 9:
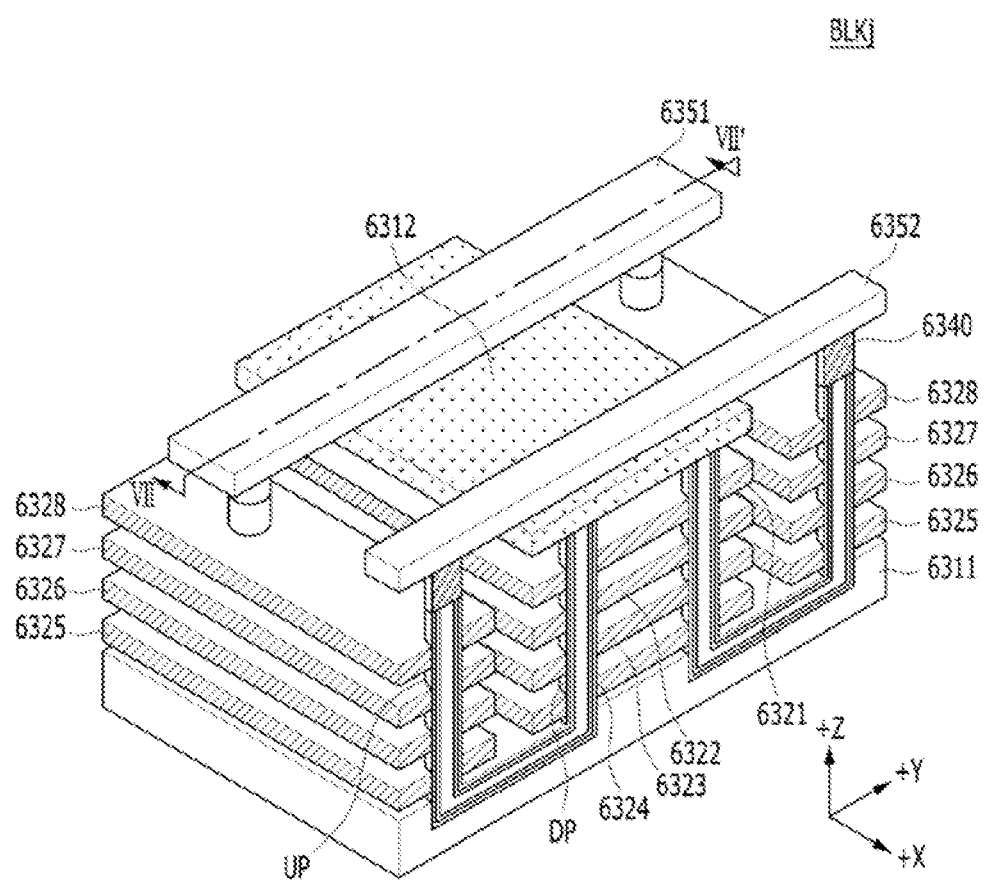

FIG. 9 is a perspective view schematically illustrating the memory device implemented with a three-dimensional (3D) nonvolatile memory device in accordance with an embodiment, which has the second structure that is different from the first structure described above with reference to FIGS. 5 to 8. FIG. 9 show a certain memory block BLKj having the second structure in the plurality of memory blocks of FIG. 4, and FIG. 10 is a cross-sectional view illustrating the certain memory block BLKj and taken along the line VII-VII' of FIG. 9.

Figure 10:
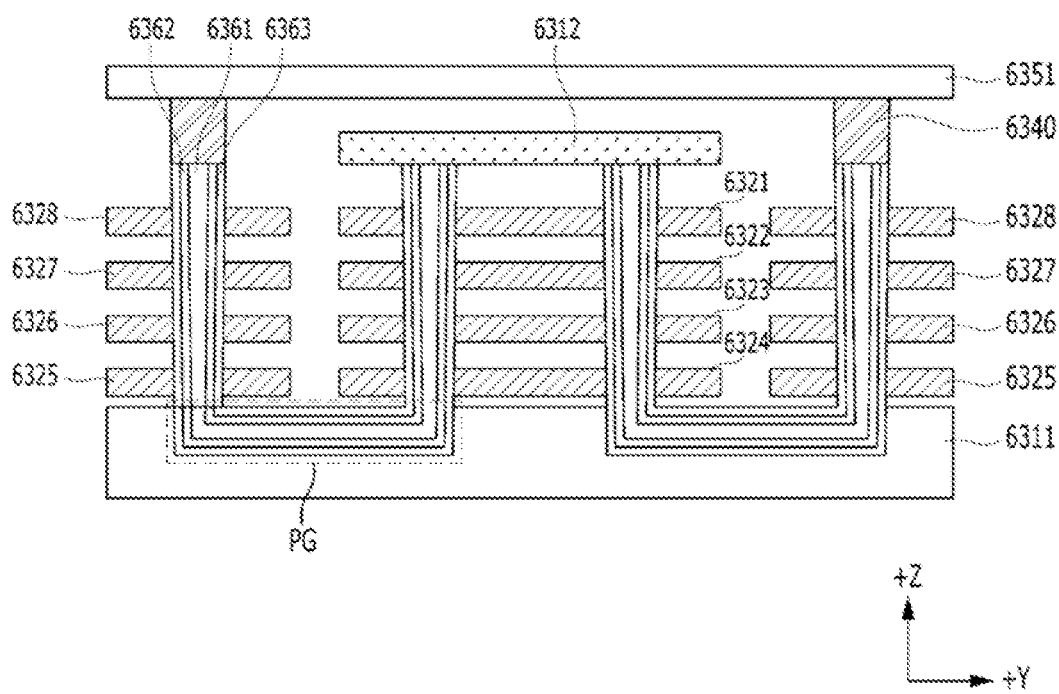

Referring to FIGS. 9 and 10, the certain memory block BLKJ among the plurality of memory blocks of the memory device 150 of FIG. 1 may include structures which extend in the first to third directions.

A substrate 6311 may be provided. For example, the substrate 6311 may include a silicon material doped with a first type impurity. For example, the substrate 6311 may include a silicon material doped with a p-type impurity, or may be a p-type well, for example, a pocket p-well, and include an n-type well which surrounds the p-type well. While it is described in the embodiment for a simplified explanation that the substrate 6311 is p-type silicon, it is to be noted that the substrate 6311 is not limited to being p-type silicon.

First to fourth conductive materials 6321 to 6324 which extend in the x-axis direction and the y-axis direction are provided over the substrate 6311. The first to fourth conductive materials 6321 to 6324 are separated by a predetermined distance in the z-axis direction.

Fifth to eighth conductive materials 6325 to 6328 which extend in the x-axis direction and the y-axis direction are provided over the substrate 6311. The fifth to eighth conductive materials 6325 to 6328 are separated by the predetermined distance in the z-axis direction. The fifth to eighth conductive materials 6325 to 6328 are separated from the first to fourth conductive materials 6321 to 6324 in the y-axis direction.

A plurality of lower pillars DP which pass through the first to fourth conductive materials 6321 to 6324 are provided. Each lower pillar DP extends in the z-axis direction. Also, a plurality of upper pillars UP which pass through the fifth to eighth conductive materials 6325 to 6328 are provided. Each upper pillar UP extends in the z-axis direction.

Each of the lower pillars DP and the upper pillars UP includes an internal material 6361, an intermediate layer 6362, and a surface layer 6363. The intermediate layer 6362 serves as a channel of the cell transistor. The surface layer 6363 includes a blocking dielectric layer, a charge storing layer and a tunneling dielectric layer.

The lower pillar DP and the upper pillar UP are electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction is provided over the lower pillars DP. For example, the doping material 6312 of the second type may include an n-type silicon material. The doping material 6312 of the second type serves as a common source line CSL.

Drains 6340 are provided over the upper pillars UP. For example, the drains 6340 may include an n-type silicon material. First and second upper conductive materials 6351 and 6352 which extend in the y-axis direction are provided over the drains 6340.

The first and second upper conductive materials 6351 and 6352 are separated in the x-axis direction. For example, the first and second upper conductive materials 6351 and 6352 may be formed of a metal. For instance, the first and second upper conductive materials 6351 and 6352 and the drains 6340 may be electrically coupled with each other through contact plugs. The first and second upper conductive materials 6351 and 6352 respectively serve as first and second bit lines BL1 and BL2.

The first conductive material 6321 serves as a source select line SSL, and the second conductive material 6322 serves as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, and the seventh conductive material 6327 serves as a second dummy word line DWL2, and the eighth conductive material 6328 serves as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string are electrically coupled through the pipe gate PG. One end of the lower string is electrically coupled to the doping material 6312 of the second type which serves as the common source line CSL. One end of the upper string is electrically coupled to a corresponding bit line through the drain 6340. One lower string and one upper string form one cell string which is electrically coupled between the doping material 6312 of the second type, serving as the common source line CSL, and a corresponding one of the upper conductive material layers 6351 and 6352, serving as the bit line BL.

That is, the lower string includes a source select transistor SST, a first dummy memory cell DMC1, and first and second main memory cells MMC1 and MMC2. The upper string includes third and fourth main memory cells MMC3 and MMC4, a second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
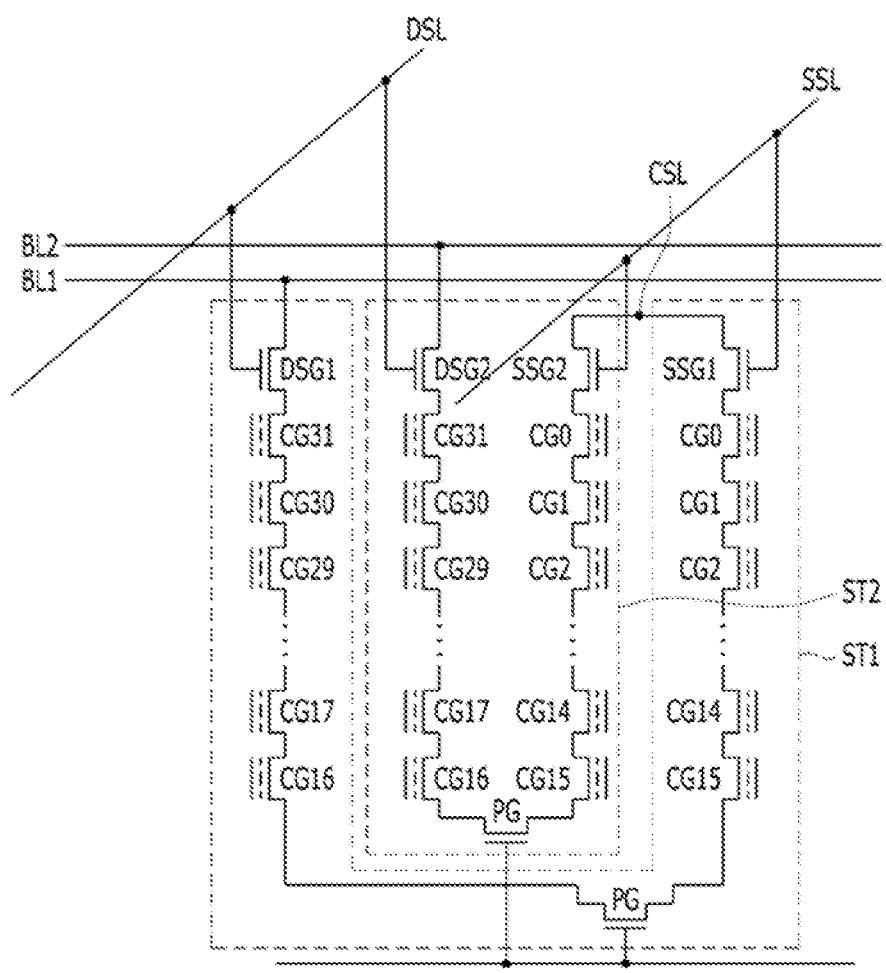

FIG. 11 is an equivalent circuit diagram illustrating the memory block BLKJ having the second structure as described above with reference to FIGS. 9 and 10. For a simplified explanation, only a first string and a second string, which form a pair in the certain memory block BLKj, are shown.

Referring to FIG. 11, in the certain memory block BLKj having the second structure, among the plurality of blocks of the memory device 150, as described above with reference to FIGS. 9 and 10, cell strings, each of which is implemented with one upper string and one lower string electrically coupled through the pipe gate PG, may be provided in pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 are electrically coupled to the same drain select line DSL and the same source select line SSL. The first string ST1 is electrically coupled to a first bit line BL1, and the second string ST2 is electrically coupled to a second bit line BL2.

While it is described in FIG. 11 that the first string ST1 and the second string ST2 are electrically coupled to the same drain select line DSL and the same source select line SSL, the first string ST1 and the second string ST2 may be electrically coupled to the same source select line SSL and the same bit line BL, and the first string ST1 is electrically coupled to a first drain select line DSL1 and the second string ST2 is electrically coupled to a second drain select line DSL2, or it may be envisaged that the first string ST1 and the second string ST2 are electrically coupled to the same drain select line DSL and the same bit line BL, and the first string ST1 is electrically coupled to a first source select line SSL1 and the second string ST2 is electrically coupled a second source select line SSL2. Hereinafter, data processing to a memory device in a memory system in accordance with an embodiment of the present invention, that is, a data program operation will be described in more detail.

Figure 12:
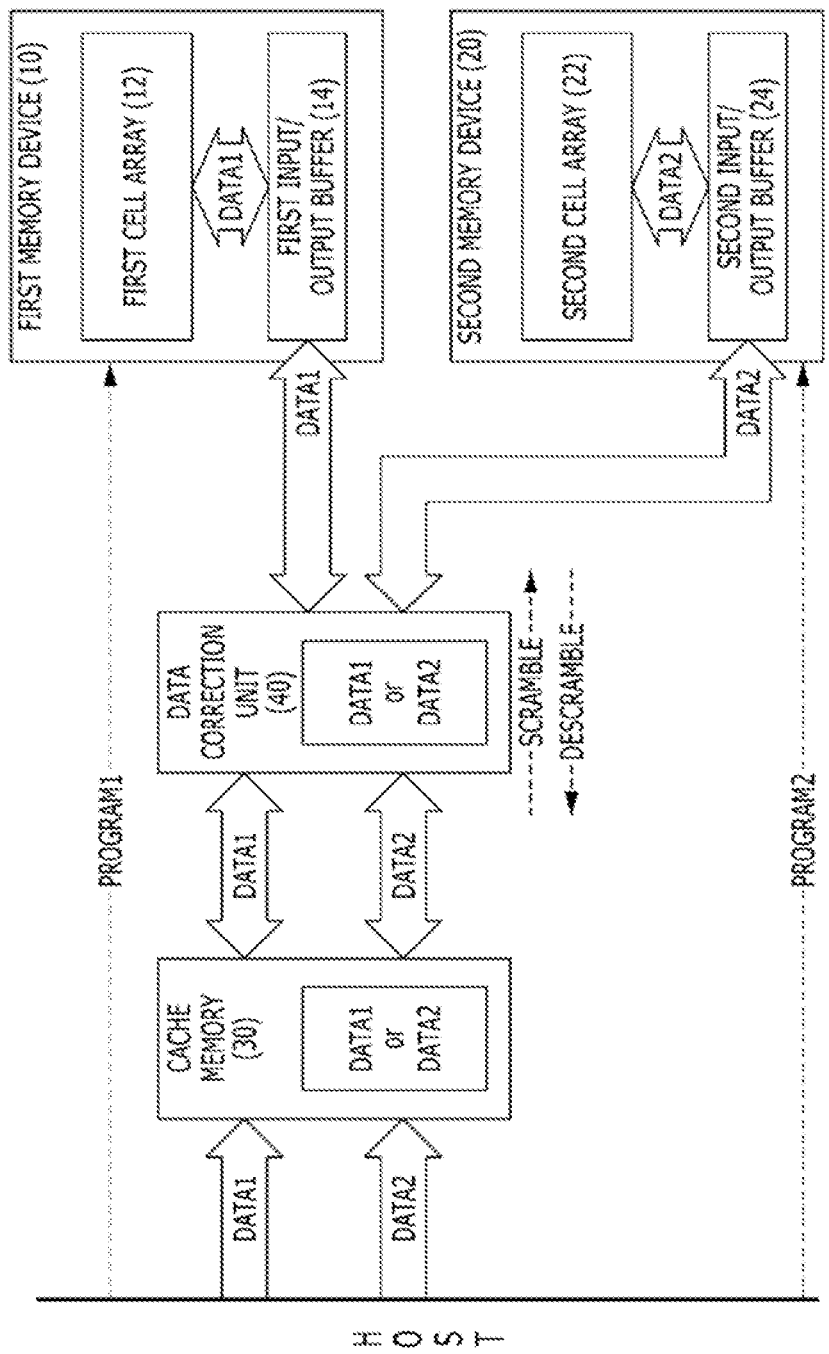
FIG. 12 is a block diagram for illustrating a memory system in accordance with an embodiment of the present invention.

FIG. 12 is a block diagram for illustrating a memory system in accordance with an embodiment of the present invention.

Figure 13:
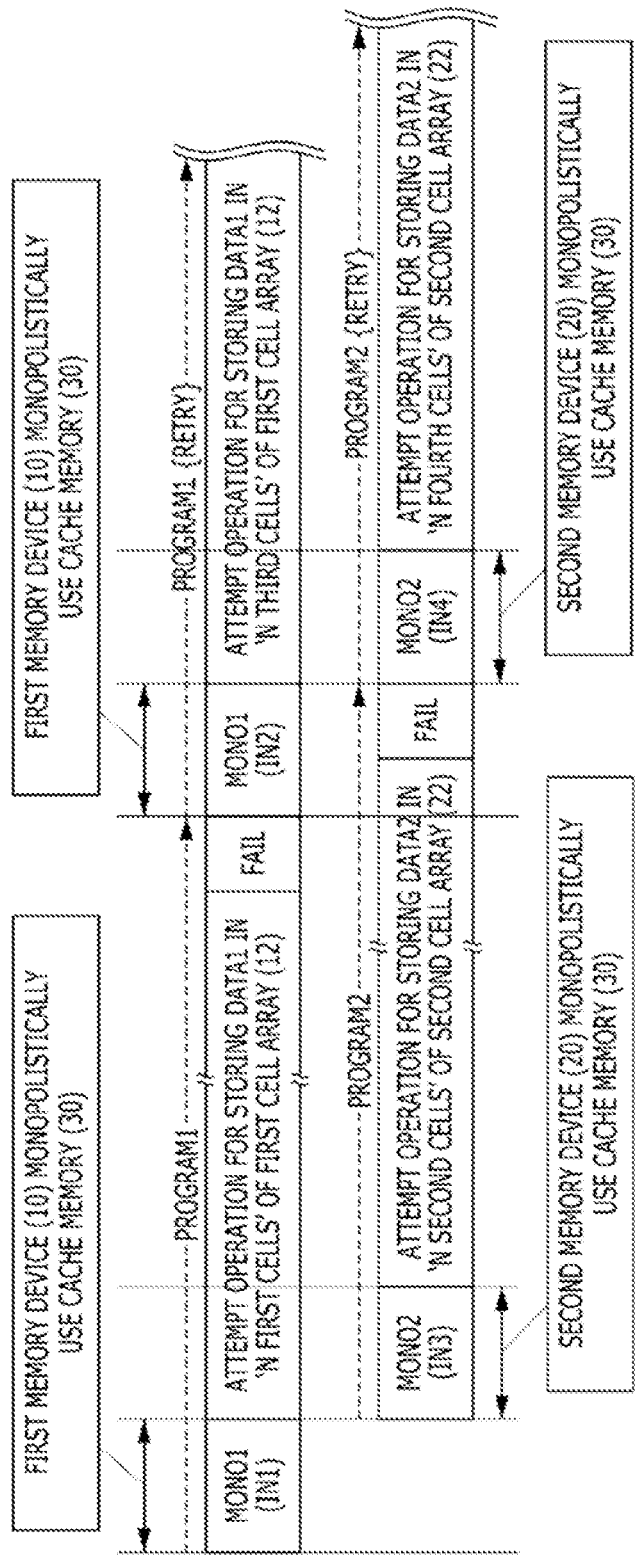
FIG. 13 is a timing diagram for explaining a data processing operation in the memory system illustrated in FIG. 12 in accordance with an embodiment of the present invention.

FIG. 13 is a timing diagram for explaining a data processing operation in the memory system illustrated in FIG. 12 in accordance with an embodiment of the present invention.

FIG. 14a to FIG. 14d are block diagrams for explaining the data processing operation based on the configuration of the memory system illustrated in FIG. 12 in accordance with an embodiment of the present invention.

Referring to FIG. 12, the memory system in accordance with the embodiment of the present invention includes a first memory device 10, a second memory device 20, a data correction unit 40, and a cache memory 30. The first memory device 10 includes a first cell array 12 and a first input/output buffer 14. The second memory device 20 includes a second cell array 22 and a second input/output buffer 24.

Each of the first memory device 10 and the second memory device 20 indicates the memory device 150 of the elements of the memory system illustrated in FIG. 1. FIG. 12 illustrates that the two memory devices 10 and 20 are included; however, this is for illustrative purposes only and, actually, a larger number of memory devices may be included. Accordingly, it can be understood that the memory system illustrated in FIG. 12 in accordance with the embodiment of the present invention is a memory system including at least two memory devices 150 (10 and 20) as illustrated in FIG. 1.

In detail, the first cell array 12 includes a plurality of cells (not illustrated) for storing first data DATA1 of the first memory device 10 in an array form. For example, when the first memory device 10 is a nonvolatile memory device such as a NAND flash memory device or a NOR flash memory device, as illustrated in FIG. 2 to FIG. 11, each of the plurality of cells (not illustrated) may be a single level cell (SLC) or a multilevel cell (MLC). That is, the first data DATA1 may be 1-bit data or data of two bits or more.

The first input/output buffer 14 buffers the first data DATA1 inputted/outputted in the first memory device 10. For example, when the first memory device 10 is a nonvolatile memory device such as a NAND flash memory device or a NOR flash memory device as illustrated in FIG. 2 to FIG. 11, the first input/output buffer 14 may be a page buffer (PB).

The second cell array 22 includes a plurality of cells (not illustrated) for storing second data DATA2 of the second memory device 20 in an array. For example, when the second memory device 20 is a nonvolatile memory device such as a NAND flash memory device or a NOR flash memory device as illustrated in FIG. 2 to FIG. 11, each of the plurality of cells (not illustrated) may be a single level cell (SLC) or a multilevel cell (MLC). That is, the second data DATA2 may be 1-bit data or data of two bits or more. Of course, the first data DATA1 and the second data DATA2 may be data having the same number of bits.

The second input/output buffer 24 buffers the second data DATA2 inputted/outputted in the second memory device 20. For example, when the second memory device 20 is a nonvolatile memory device such as a NAND flash memory device or a NOR flash memory device as illustrated in FIG. 2 to FIG. 11, the second input/output buffer 24 may be a page buffer (PB).

The cache memory 30 selectively and temporarily stores the first and second DATA1 and DATA2 transferred between a host HOST and the first and second input/output buffers 14 and 24. That is, the first data DATA1 is stored in the cache memory 30 in an operation section in which the first data DATA1 is transferred between the host HOST and the first input/output buffer 14, and the second data DATA2 is stored in the cache memory 30 in an operation section in which the second data DATA2 is transferred between the host HOST and the second input/output buffer 24. In this case, the cache memory 30 may select and store any one of the first data DATA1 and the second data DATA2, and the cache memory 30 may not simultaneously store the first data DATA1 and the second data DATA2. That is, the first memory device 10 and the second memory device 20 share the cache memory 30 for use.

The cache memory 30 indicates the memory 144 included in the controller 130 of the elements of the memory system illustrated in FIG. 1. There is a difference in that the memory device 150 monopolistically uses the memory 144 in the memory system of FIG. 1, but the two memory devices 10 and 20 share the cache memory 30 for use in the memory system of FIG. 12.

As described above, for the first memory device 10 and the second memory device 20 to share the cache memory 30, the following limitations exist in the embodiments of the present invention.

Referring to FIG. 12 and FIG. 13, only in a first monopoly section MONO1 of a first program section PROGRAM1 in which the first data DATA1 is stored in the first memory device 10, the first data DATA1 is stored in the cache memory 30. That is, the first memory device 10 does not monopolistically use the cache memory 30 in the first program section, and monopolistically uses the cache memory 30 only in the first monopoly section MONO1, which is smaller than the first program section PROGRAM1.

Furthermore, only in a second monopoly section MONO2 of a second program section PROGRAM2 in which the second data DATA2 is stored in the second memory device 20, the second data DATA2 is stored in the cache memory 30. That is, the second memory device does not monopolistically use the cache memory 30 in the second program section PROGRAM2, and monopolistically uses the cache memory 30 only in the second monopoly section MONO2, which is smaller than the second program section PROGRAM2.

The first monopoly section MONO1 and the second monopoly section MONO2 are set not to overlap each other.

As described above, when the first memory device 10 uses the cache memory 30 only in the first monopoly section MONO1, and the second memory device 20 uses the cache memory 30 only in the second monopoly section MONO2, and the first monopoly section MONO1 and the second monopoly section MONO2 are set not to overlap each other, the first memory device 10 and the second memory device 20 may share the cache memory 30 for use without any problems even in a section in which the first program section PROGRAM1 and the second program section PROGRAM2 overlap each other.

The first monopoly section MONO1 includes the following two sections.

A first section is a first input section IN1 from when the first data DATA1 has been inputted from the host HOST to the cache memory 30 and stored in the cache memory 30 in order to perform an operation of the first program section PROGRAM1 until the first data DATA1 is transferred to and stored in the first input/output buffer 14.

A second section is a second input section IN2 from when the first data DATA1 stored in the first input/output buffer 14 has been outputted to the cache memory 30 and stored in the cache memory until the first data DATA1 is transferred to and stored in the first input/output buffer 14 in order to perform the operation of the first program section PROGRAM1 again when the operation of the first program section PROGRAM1 is determined to 'fail' after the first input section IN1.

The second monopoly section MONO2 includes the following two sections.

A first section is a third input section IN3 from when the second data DATA2 has been inputted from the host HOST to the cache memory 30 and stored in the cache memory 30 in order to perform an operation of the second program section PROGRAM2 until the second data DATA2 is transferred to and stored in the second Input/output buffer 24.

A second section is a fourth input section IN4 from when the second data DATA2 stored in the second input/output buffer 24 has been outputted to the cache memory 30 and stored in the cache memory 30 until the second data DATA2 is transferred to and stored in the second input/output buffer 24 in order to perform the operation of the second program section PROGRAM2 again when the operation of the second program section PROGRAM2 is determined to 'fail' after the third input section IN3.

As described above, it can be understood that the first monopoly section MONO1 occupies only a partial section of the first program section PROGRAM1, which corresponds to a time until the first data DATA1 is transferred from the cache memory 30 to the first input/output buffer 14. For example, when the first memory device 10 is a nonvolatile memory device such as a NAND flash memory device or a NOR flash memory device as illustrated in FIG. 2 to FIG. 11, typically the operation of the first program section PROGRAM1 takes a very long time, exceeding 1000 ms, and a time corresponding to the first monopoly section MONO1, required to transfer the first data DATA1 from the cache memory 30 to the first input/output buffer 14 is very short. That is, it is typical that the length of the first monopoly section MONO1 is very short, generally equal to or less than 1/10 of the first program section PROGRAM1.

The length of the first monopoly section MONO1 being much shorter than that of the first program section PROGRAM1 is similar to that of the second monopoly section MONO2. That is, it is typical that the length of the second monopoly section MONO2 be equal to or less than 1/10 of the second program section PROGRAM2.

Accordingly, the first monopoly section MONO1 and the second monopoly section MONO2 may be set not to overlap each other such that the first program section PROGRAM1 and the second program section PROGRAM2 are repeated with a preset time difference. For example, as illustrated in FIG. 13, when the first program section PROGRAM1 is started earlier than the second program section PROGRAM2, the second program section PROGRAM2 may be started at a time point at which at least a time corresponding to the first input section IN1 has passed after the first program section PROGRAM1 is started, so that the third input section IN3 overlaps the first program section PROGRAM1. In contrast to FIG. 13, when the second program section PROGRAM2 is started earlier than the first program section PROGRAM1, the first program section PROGRAM1 may be be started at a time point at which at least a time corresponding to the second input section IN2 has passed after the second program section PROGRAM2 is started, so that the first input section IN1 overlaps the second program section PROGRAM2.

In this case, the second and fourth input sections IN2 and IN4 are entered, respectively, when the operations of the first and second program sections PROGRAM1 and PROGRAM2 are determined to 'fail'. As illustrated in FIG. 13, when both the operations of the first and second program sections PROGRAM1 and PROGRAM2 are determined to 'fail', the second input section IN2 and the fourth input section IN4 are set not to overlap each other. However, differently from FIG. 13, when only the operation of the first program section PROGRAM1 or the second program section PROGRAM2 is determined to 'fail', other overlapping forms may be obtained.

The fact that the operation of the first program section PROGRAM1 or the second program section PROGRAM2 is determined to 'fail' represents that the first data DATA1 or the second data DATA2 has not been properly stored in the first cell array 12 or the second cell array 22 in the operation of the first program section PROGRAM1 or the second program section PROGRAM2. There are various reasons why the operation of the first program section PROGRAM1 or the second program section PROGRAM2 may fall. Among them, the biggest reason is that the cells of the first cell array 12 or the second cell array 22, in which the first data DATA1 or the second data DATA2 is to be stored, are failed cells. Therefore, when the operation of the first program section PROGRAM1 or the second program section PROGRAM2 is determined to 'fail', the existing specific cells of the first cell array 12 or the second cell array 22, in which the first data DATA1 or the second data DATA2 is to be stored, should be replaced with other storage cells, and the operation of the first program section PROGRAM1 or the second program section PROGRAM2 for storing the first data DATA1 or the second data DATA2 should be performed again.

For example, when it is described that the first data DATA1 or the second data DATA2 is to be stored in 'N first cells' included in the first cell array 12 or 'N second cells' included in the second cell array 22, the first data DATA1 or the second data DATA2 should be stored in 'N third cells' completely different from the 'N first cells' and included in the first cell array 12 or 'N fourth cells' completely different from the 'N second cells' and included in the second cell array 22 after the operation of the first program section PROGRAM1 or the second program section PROGRAM2 is determined to 'fail'. The aforementioned second input section IN2 or fourth input section IN4 is necessarily included in a process {ENTRY} in which the operation of the first program section PROGRAM1 or the second program section PROGRAM2 is performed again.

Furthermore, in the process {ENTRY} in which the operation of the first program section PROGRAM1 or the second program section PROGRAM2 including the second input section IN2 or the fourth input section IN4 is performed again, a 'fail' may occur again. In this case, the operation of the first program section PROGRAM1 or the second program section PROGRAM2 including the second input section IN2 or the fourth input section IN4 is performed again. Of course, whenever the operation of the first program section PROGRAM1 or the second program section PROGRAM2 is performed, the cells of the first cell array 12 or the cells of the second cell array 22, in which the first data DATA1 or the second data DATA2 is to be stored, should be continuously changed to different cells.

With reference to FIG. 14a to FIG. 14d, an operation of the second input section IN2 or an operation of the fourth input section IN4 will be described in detail.

Figure 14A:
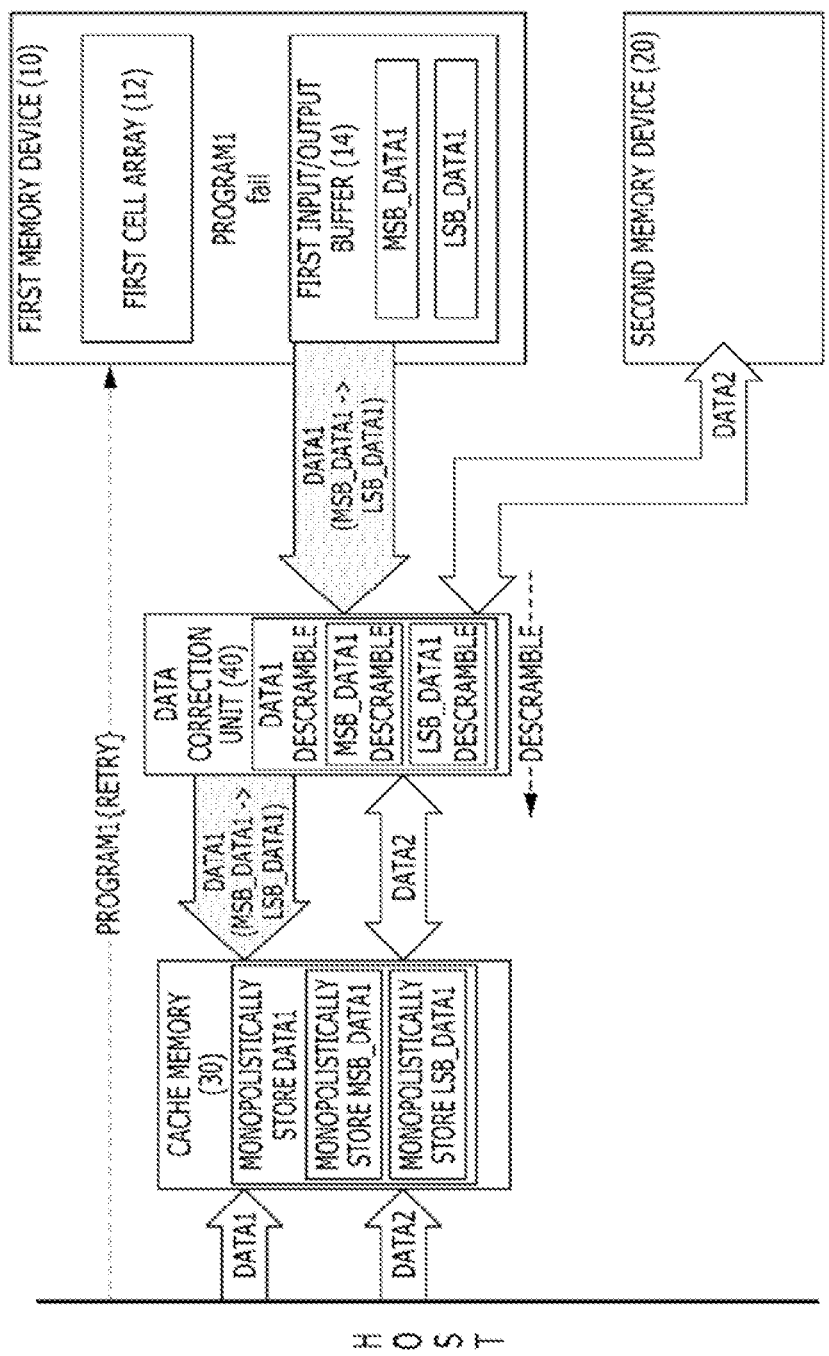
FIG. 14a to FIG. 14d are block diagrams for explaining a data processing operation based on a configuration of the memory system illustrated in FIG. 12 in accordance with an embodiment of the present invention.
Figure 14B:
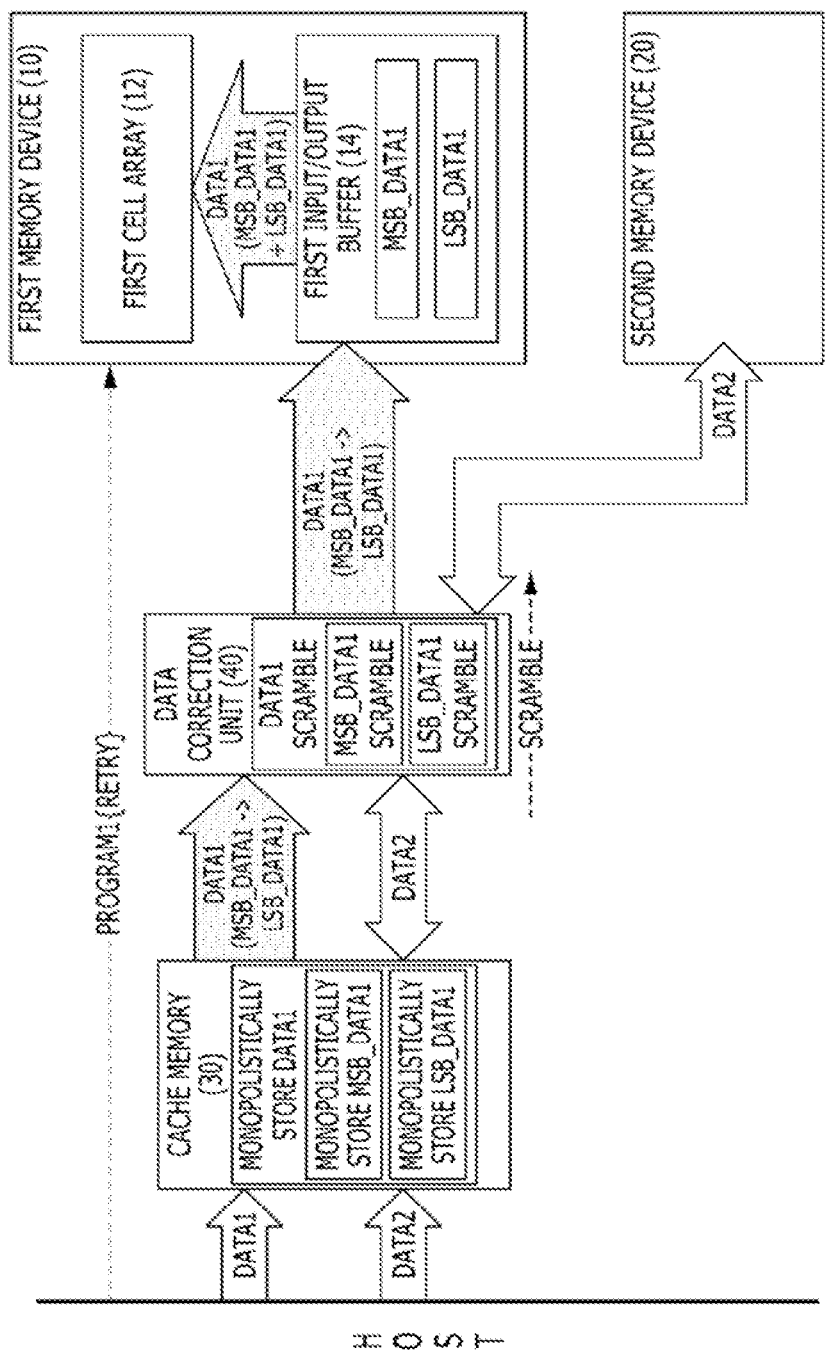
Figure 14C:
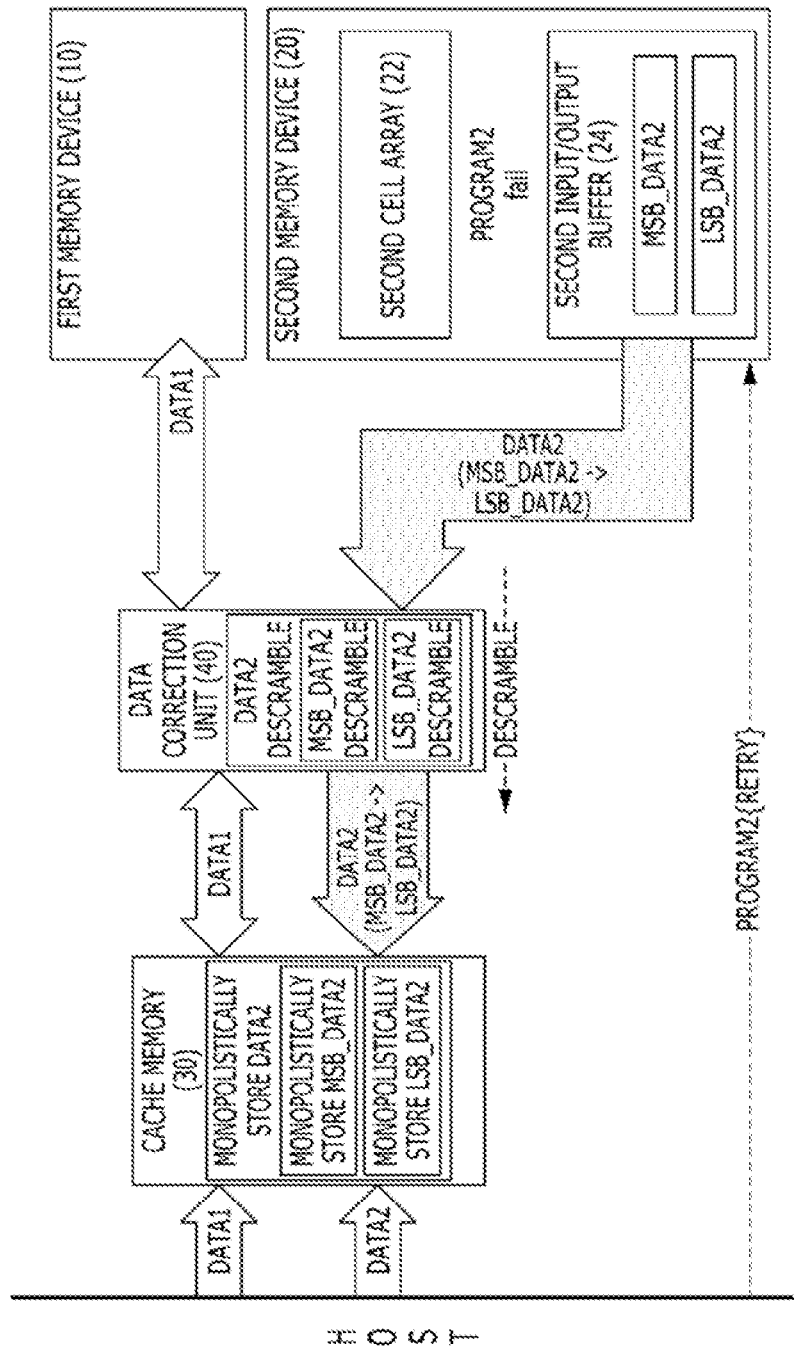

In a first operation illustrated in FIG. 14a and FIG. 14c, in order for the process {ENTRY} of performing the operation of the first program section PROGRAM1 or the second program section PROGRAM2 again, the first data DATA1 or the second data DATA2 previously stored in the first input/output buffer 14 or the second input/output buffer 24 in the first input section IN1 or the third input section IN3 is moved to and stored in the cache memory 30.

Figure 14D:
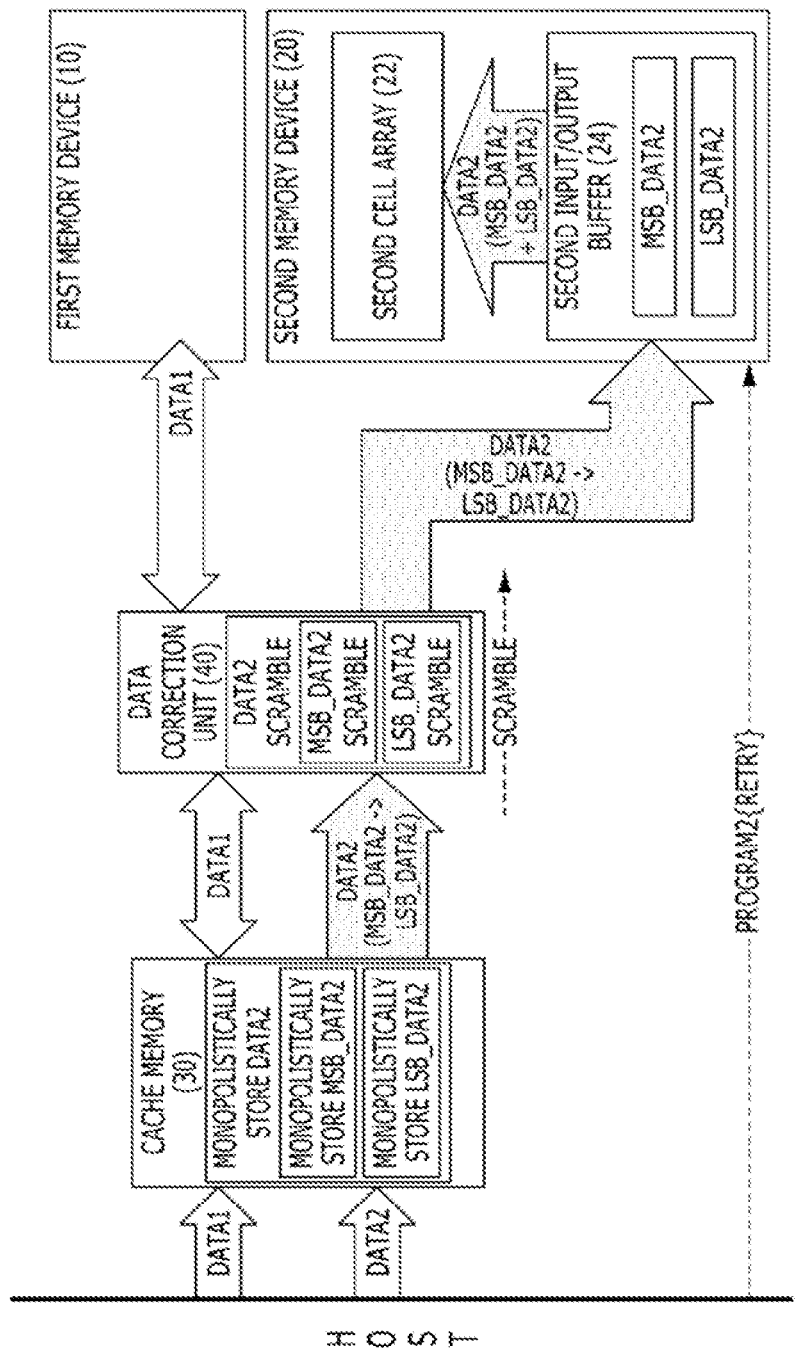

In a second operation illustrated in FIG. 14b and FIG. 14d, the first data DATA1 or the second data DATA2 monopolistically stored in the cache memory 30 in the first operation illustrated in FIG. 14a and FIG. 14c is transferred to the first input/output buffer 14 or the second input/output buffer 24, so that the operation of the first program section PROGRAM1 or the operation of the second program section PROGRAM2 is performed again.

The operation of the second input section IN2 or the operation of the fourth input section IN4 should be divided into the first operation and the second operation and the first operation and the second operation should be sequentially performed, because the data correction unit 40 exists.

The data correction unit 40 performs an operation for scrambling or descrambling the first data DATA1 and the second data DATA2 transferred between the cache memory 30 and the first memory device 10/the second memory device 20. That is, the data correction unit 40 performs a scrambling operation for the first data DATA1 and the second data DATA2 transferred from the cache memory 30 to the first memory device 10 and the second memory device 20, and the data correction unit 40 performs a descrambling operation for the first data DATA1 and the second data DATA2 transferred from the first memory device 10 and the second memory device 20 to the cache memory 30.

The scrambling operation for the first data DATA1 and the second data DATA2 indicates an operation for randomizing data to reduce the occurrence of interference in a process of adding or storing an ECC code for an error correction operation. Of course, the descrambling operation for the first data DATA1 and the second data DATA2 is reverse to the scrambling operation.

Due to the presence of the data correction unit 40 as described above, the first data DATA1 stored in the cache memory 30 may have substantially the same value at all times and the first data DATA1 stored in the first input/output buffer 14 may have different values based on whether the operation of the first program section PROGRAM1 is determined to 'fail'. This is because cells of the first cell array 12, in which the first data DATA1 is to be stored in the first program section PROGRAM1 before the 'fail' determination is made, are different from cells of the first cell array 12, in which the first data DATA1 is to be stored in the first program section PROGRAM1 after the 'fail' determination is made.

Similarly, due to the presence of the data correction unit 40, the second data DATA2 stored in the cache memory 30 may have substantially the same value at all times and the second data DATA2 stored in the second input/output buffer 24 may have different values based on whether the operation of the second program section PROGRAM2 is determined to 'fail'. This is because cells of the second cell array 22, in which the second data DATA2 is to be stored in the second program section PROGRAM2 before the 'fail' determination is made, are different from cells of the second cell array 22, in which the second data DATA2 is to be stored in the second program section PROGRAM2 after the 'fail' determination is made.

Due to the aforementioned reasons, the operation of the second input section IN2 or the operation of the fourth input section IN4 should be divided into the first operation and the second operation and the first operation and the second operation should be sequentially performed.

When the plurality of cells (not illustrated) included in the first cell array 12 and the second cell array 22 are multilevel cells (MLCs) capable of storing multi-bit data, each operation of the first program section PROGRAM1 and the operation of the second program section PROGRAM2 may be performed in a scheme of a one-shot program operation. The one-shot program operation indicates an operation for programming multi-bit data at once. For example, when data to be programmed is 2-bit data and includes MSB data and LSB data, the MSB data is programmed and then the LSB data is programmed, that is, a sequential program scheme is for operations other than the one-shot program operation, but the one-shot program operation uses a scheme of simultaneously programming the MSB data and the LSB data.

In detail, when each of the operation of the first program section PROGRAM1 and the operation of the second program section PROGRAM2 is performed in the scheme of the one-shot program operation, the first data DATA1 and the second data DATA2 are multi-bit data.

For example, the first data DATA1 is multi-bit data of 2 bits and may be divided into first MSB data MSB_DATA1 and first LSB data LSB_DATA1, and the second data DATA2 is multi-bit data of 2 bits and may be divided into second MSB data MSB_DATA2 and second LSB data LSB_DATA2. In this case, the cache memory 30 separately stores the first MSB data MSB_DATA1 and the first LSB data LSB_DATA1 or separately stores the second MSB data MSB_DATA2 and the second LSB data LSB_DATA2 in a selective manner. Furthermore, the first input/output buffer 14 separately stores the first MSB data MSB_DATA1 and the first LSB data LSB_DATA1, and the second input/output buffer 24 separately stores the second MSB data MSB_DATA2 and the second LSB data LSB_DATA2. The first MSB data MSB_DATA1 and the first LSB data LSB_DATA1 stored in the first input/output buffer 14 in the first program section PROGRAM1 are simultaneously programmed (MSB_DATA1+LSB_DATA1) in a cell to be programmed in the first cell array 12. Furthermore, the second MSB data MSB_DATA2 and the second LSB data LSB_DATA2 stored in the second input/output buffer 24 in the second program section PROGRAM2 are simultaneously programmed (MSB_DATA2+LSB_DATA2) in a cell to be programmed in the second cell array 22.

In this way, in the one-shot program operation, the multi-bit data may be simultaneously programmed at all times, but the multi-bit data is divided and transmitted between the cache memory 30 and the input/output buffers 14 and 24. For example, when the first data DATA1 is transmitted between the cache memory 30 and the input/output buffer 14 in each of the first input section IN1 and the second input section IN2, the first LSB data LSB_DATA1 may be transmitted after the first MSB data MSB_DATA1 is transmitted (MSB_DATA1→LSB_DATA1) as illustrated in FIG. 14a and FIG. 14b, but in contrast to FIG. 14a and FIG. 14b, the first MSB data MSB_DATA1 may be transmitted after the first LSB data LSB_DATA1 is transmitted (LSB_DATA1→MSB_DATA1). Similarly, when the second data DATA2 is transmitted between the cache memory 30 and the input/output buffer 24 in each of the third input section IN3 and the fourth input section IN4, the second LSB data LSB_DATA2 may be transmitted after the second MSB data MSB_DATA2 is transmitted (MSB_DATA2→LSB_DATA2) as illustrated in FIG. 14c and FIG. 14d, but in contrast to FIG. 14c and FIG. 14d, the second MSB data MSB_DATA2 may be transmitted after the second LSB data LSB_DATA2 is transmitted (LSB_DATA2→MSB_DATA2).

As described above, when the present invention is applied, the memory device may monopolistically use the cache memory only in a partial monopoly section of the program operation section, and release the cache memory in the other sections.

Consequently, a plurality of memory devices may properly perform a program operation while sharing one cache memory for use.

Furthermore, a plurality of memory devices share one cache memory for use, so that a memory system including a plurality of memory devices may significantly reduce the capacity of a cache memory used therein.

Although various embodiments have been described for illustrative purposes, it will be apparent to those skilled in the art that various changes and modifications may be made without departing from the spirit and scope of the invention as defined in the following claims.

What is claimed is:
1. A memory system comprising:
a first memory device including a first input/output buffer;
a second memory device including a second input/output buffer; and
a controller including a cache memory allocated for either first data or second data, wherein, during a first partial section of a first program section to program the first data input from a host in the first memory device, the controller receives the first data and stores the first data in the cache memory, and transfers the first data to the first input/output buffer and then releases the first data in the cache memory without any request from the host after the first partial section of the first program section before second partial section of a second program section starts, wherein, during the second partial section of the second program section to program the second data input from the host in the second memory device, the controller receives the second data and stores the second data in the cache memory, and transfers the second data to the second input/output buffer and then releases the second data in the cache memory without any request from the host after the second partial section of the second program section before a second operation of the first partial section of the first program section starts, and wherein, even though the first and second program sections are overlapped with each other, the first and second partial sections are not overlapped with each other, and the controller stores only one of the first and second data in the cache memory for each of the first and second partial sections.

2. The memory system of claim 1, wherein the controller further includes: a data correction unit configured to scramble and descramble the first and second data transferred between the cache memory and the first and second memory devices.

3. The memory system of claim 2, wherein the first partial section includes:
a first input section from when the first data is inputted from the host to the cache memory and stored in the cache memory to when the first data is transferred to and stored in the first input/output buffer, for a first operation of the first program section; and
a second input section from when the first data stored in the first input/output buffer is outputted to and stored in the cache memory to when the first data is transferred to and stored in the first input/output buffer, for the second operation of the first program section when the first operation of the first program section is determined to 'fail' after the first input section.

4. The memory system of claim 3, wherein the second partial section includes:
a third input section from when the second data is inputted from the host to the cache memory and stored in the cache memory to when the second data is transferred to and stored in the second input/output buffer, for a first operation of the second program section; and
a fourth input section from when the second data stored in the second input/output buffer is outputted to and stored in the cache memory to when the second data is transferred to and stored in the second input/output buffer, for a second operation of the second program section when the first operation of the second program section is determined to 'fail' after the third input section.

5. The memory system of claim 4, wherein the first program section and the second program section are repeated with a preset time difference,
wherein when the second program section is started when the first input section passes after the first program section is started, the third input section overlaps the first program section, and wherein when the first program section is when the second input section passes after the second program section is started, the first input section overlaps the second program section.

6. The memory system of claim 4, wherein the first data stored in the cache memory is scrambled through the data correction unit and is stored in the first input/output buffer in the first and second input sections,
wherein the second data stored in the cache memory is scrambled through the data correction unit and is stored in the second input/output buffer in the third and fourth input sections,
wherein the first data stored in the first input/output buffer is descrambled through the data correction unit and stored in the cache memory in the second input section, and
wherein the second data stored in the second input/output buffer is descrambled through the data correction unit and stored in the cache memory in the fourth input section.

7. The memory system of claim 6, wherein the first data stored in the first input/output buffer in the first input section is stored in a page set in the first memory device through the first operation of the first program section,
wherein the first data stored in the first input/output buffer in the second input section is stored in a different page than the page set in the first memory device through the second operation of the first program section, and
wherein only when the first operation of the first program section corresponding to the first input section is determined to 'fail', the second operation of the first program section corresponding to the second input section is performed.

8. The memory system of claim 7, wherein, whenever the second operation of the first program section corresponding to the second input section is determined to 'fail', the second operation of the first program section corresponding to the second input section is repeatedly performed a preset number of times, and
wherein whenever the second operation of the first program section corresponding to the second input section is repeatedly performed the preset number of times, the first data is stored in different pages of the first memory device.

9. The memory system of claim 6, wherein the second data stored in the second input/output buffer in the third input section is stored in a page set in the second memory device through the first operation of the second program section,
wherein the second data stored in the second input/output buffer in the fourth input section is stored in a different page than the page set in the second memory device through the second operation of the second program section, and
wherein only when the first operation of the second program section corresponding to the third input section is determined to 'fail', the second operation of the second program section corresponding to the fourth input section is performed.

10. The memory system of claim 9, wherein, whenever the second operation of the second program section corresponding to the fourth input section is determined to 'fail', the second operation of the second program section corresponding to the fourth input section is repeatedly performed a preset number of times, and
whenever the second operation of the second program section corresponding to the fourth input section is repeatedly performed the preset number of times, the second data is stored in different pages in the second memory device.

11. The memory system of claim 4, wherein the first memory device includes a plurality of first nonvolatile memory cells for storing multi-bit data,
wherein the first data is the multi-bit data and is divided into first MSB data and first LSB data,
wherein the cache memory and the first input/output buffer simultaneously store the first MSB data and the first LSB data in a separate manner,
wherein the first MSB data is transmitted and the first LSB data is subsequently transmitted between the cache memory and the first input/output buffer in each of the first and second input sections, and
wherein the first MSB data and the first LSB data stored in the first input/output buffer are simultaneously programmed in the plurality of first nonvolatile memory cells in the first program section.

12. The memory system of claim 11, wherein the second memory device includes a plurality of second nonvolatile memory cells for storing multi-bit data,
wherein the second data is multi-bit data and is divided into second MSB data and second LSB data,
wherein the cache memory and the second input/output buffer simultaneously store the second MSB data and the second LSB data in a separate manner,
wherein the second MSB data is transmitted and the second LSB data is subsequently transmitted between the cache memory and the second input/output buffer in each of the third and fourth input sections, and
wherein the second MSB data and the second LSB data stored in the second input/output buffer are simultaneously programmed in the plurality of second nonvolatile memory cells in the second program section.

13. An operation method of a memory system, comprising:
storing first data in a cache memory, during a first partial section of a first program section to program the first data input from a host in a first memory device;
transferring the first data received from the host and stored in the cache memory to a first input/output buffer in the first memory device so that the first memory device programs the first data in the first program section;
releasing the first data of the cache memory without any request from the host at a moment where the first data is transferred from the cache memory and stored in a first input/output buffer of the first memory device after the first partial section and before a second partial section of a second program section starts;
storing second data in the cache memory, during the second partial section of the second program section to program the second data input from the host in a second memory device;
transferring the second data received from the host and stored in the cache memory to a second input/output buffer in the second memory device so that the second memory device programs the second data in the second program section; and
releasing the second data of the cache memory without any request from the host at a moment where the second data is transferred from the cache memory and stored in a second input/output buffer of the second memory device after after the second partial section and before a re-entering of the first partial section of the first program section starts,
wherein, even though the first and second program sections are overlapped with each other, the first and second partial sections are not overlapped with each other, the cache memory stores only one of the first and second data for each of the first and second partial sections.

14. The operation method of claim 13, further comprising:
re-entering the first partial section when an operation of the first program section is determined to 'fail' after the step of releasing the first data to store the first data stored in the first input/output buffer in the cache memory;
transferring the first data stored in the cache memory through the step of re-entering the first partial section to the first input/output buffer so that the first memory device programs the first data in the first program section;
re-releasing the first data, stored in the cache memory through the step of re-entering the first partial section, at a moment where the first data is transferred from the cache memory and stored in the first input/output buffer after the first partial section and before the first program section is finished;
re-entering the second partial section when an operation of the second program section is determined to 'fail' after the step of releasing the second data to store the second data stored in the second input/output buffer in the cache memory;
transferring the second data stored in the cache memory through the step of re-entering the second partial section to the second input/output buffer so that the second memory device programs the second data in the second program section; and
re-releasing the second data, stored in the cache memory through the step of re-entering the second partial section, at a moment where the second data is transferred from the cache memory and stored in the second input/output buffer after the second partial section and before the second program section is finished.

15. The operation method of claim 14, wherein the step of releasing the first data or the step of re-releasing the first data includes scrambling the first data when transferring and storing the first data stored in the cache memory to/in the first input/output buffer, and
wherein the step of releasing the second data or step of re-releasing the second data includes scrambling the second data when transferring and storing the second data stored in the cache memory to/in the second input/output buffer.

16. The operation method of claim 15, wherein the step of re-entering the first partial section includes descrambling the first data, and
wherein the step of re-entering the second partial section includes descrambling the second data.

17. The operation method of claim 16, wherein the first data stored in the first input/output buffer through the step of releasing the first data is stored in a page set in the first memory device through the operation of the first program section, and
wherein the first data stored in the first input/output buffer through the step of re-releasing the first data is stored in different page than the page set in the first memory device through the operation of the first program section.

18. The operation method of claim 17, wherein the second data stored in the second input/output buffer through the step of releasing the second data is stored in a page set in the second memory device through the operation of the second program section, and wherein the second data stored in the second input/output buffer through the step of re-releasing the second data is stored in a different page than the page set in the second memory device through the operation of the second program section.

19. The operation method of claim 18, further comprising:

repeating the step of re-entering the first partial section and the step of re-releasing the first data a preset number of times when the operation of the first program section is determined to 'fail' after the step of re-releasing the first data; and repeating the step of re-entering the second partial section and the step of re-releasing the second data a preset number of times when the operation of the second program section is determined to 'fail' after the step of re-releasing the second data, wherein, whenever the step of repeating the first data is repeatedly performed the preset number of times, the first data is stored in different pages of the first memory device, and wherein, whenever the step of repeating the second data is repeatedly performed the preset number of times, the second data is stored in different pages of the second memory device.

20. The operation method of a memory system of claim 14, wherein when the first data is divided into first MSB data and first LSB data, the first MSB data is transmitted and the first LSB data is subsequently transmitted between the cache memory and the first input/output buffer, and the first MSB data and the first LSB data stored in the first input/output buffer are simultaneously programmed in a core area of the first memory device, and wherein when the second data is divided into second MSB data and second LSB data, the second MSB data is transmitted and the second LSB data is subsequently transmitted between the cache memory and the second input/output buffer, and the second MSB data and the second LSB data stored in the second input/output buffer are simultaneously programmed in a core area of the second memory device.

* * * * *